United States Patent [19]

Hasegawa et al.

[11] Patent Number: 4,906,830
[45] Date of Patent: Mar. 6, 1990

[54] BAR-CODE REMOTE-CONTROL DEVICE

[75] Inventors: Kazuo Hasegawa; Koji Nakase; Hiroaki Sasaki, all of Furukawa, Japan

[73] Assignee: Alps Electric Co., Ltd., Tokyo, Japan

[21] Appl. No.: 263,784

[22] Filed: Oct. 27, 1988

[30] Foreign Application Priority Data

| Feb. 12, 1988 | [JP] | Japan | 63-28825 |
| Feb. 13, 1988 | [JP] | Japan | 63-30031 |
| Mar. 11, 1988 | [JP] | Japan | 63-56275 |
| Mar. 31, 1988 | [JP] | Japan | 63-76502 |
| Mar. 31, 1988 | [JP] | Japan | 63-76503 |
| Apr. 1, 1988 | [JP] | Japan | 63-78239 |
| Apr. 6, 1988 | [JP] | Japan | 63-83052 |

[51] Int. Cl.$^4$ .................................. G06K 7/10
[52] U.S. Cl. .................................. 235/472; 235/381; 235/454; 235/462
[58] Field of Search ............... 235/381, 462, 454, 472

[56] References Cited

U.S. PATENT DOCUMENTS 4,179,064 12/1979 Yoshioka ........................... 235/381
4,471,218 9/1984 Culp ................................... 235/472

Primary Examiner—Harold I. Pitts
Attorney, Agent, or Firm—Guy W. Shoup; Stephen L. Malaska

[57] ABSTRACT

A bar-code remote-control device includes a first key for inputting a detection instructing signal and a second key for inputting a transmission instructing signal. The device also includes a gate circuit which is opened after completion of a processing in a remote-control data transmission processing section to permit entrance of the detection instructing signal in a bar-code detection processing section and is closed upon completion of bar code detection processing in the bar-code detection processing section to prohibit entrance of the detection instructing signal in the detection processing section, so that no error occurs upon simultaneous operations against the first and second keys.

7 Claims, 20 Drawing Sheets

FIG. 8
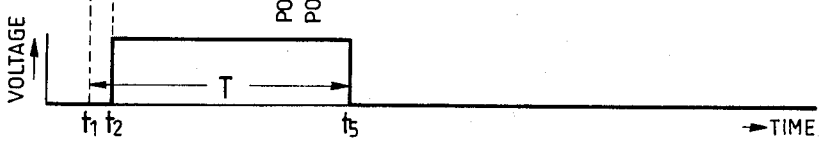
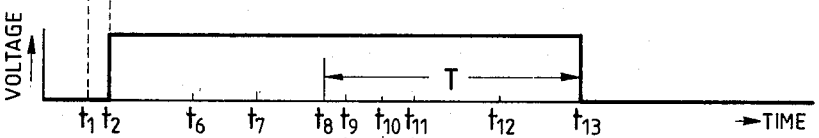
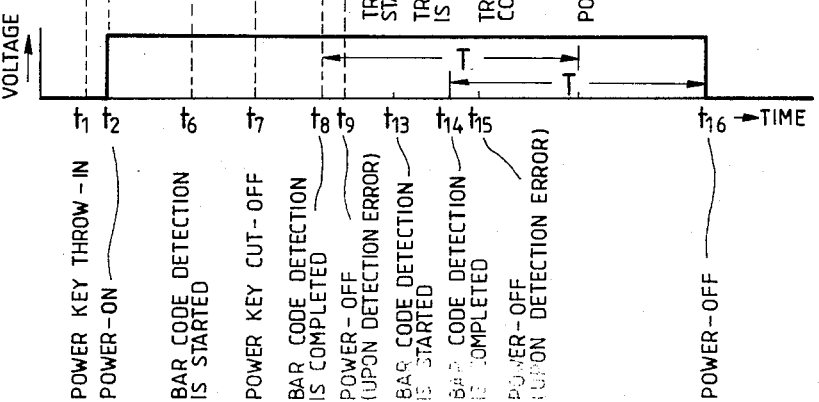

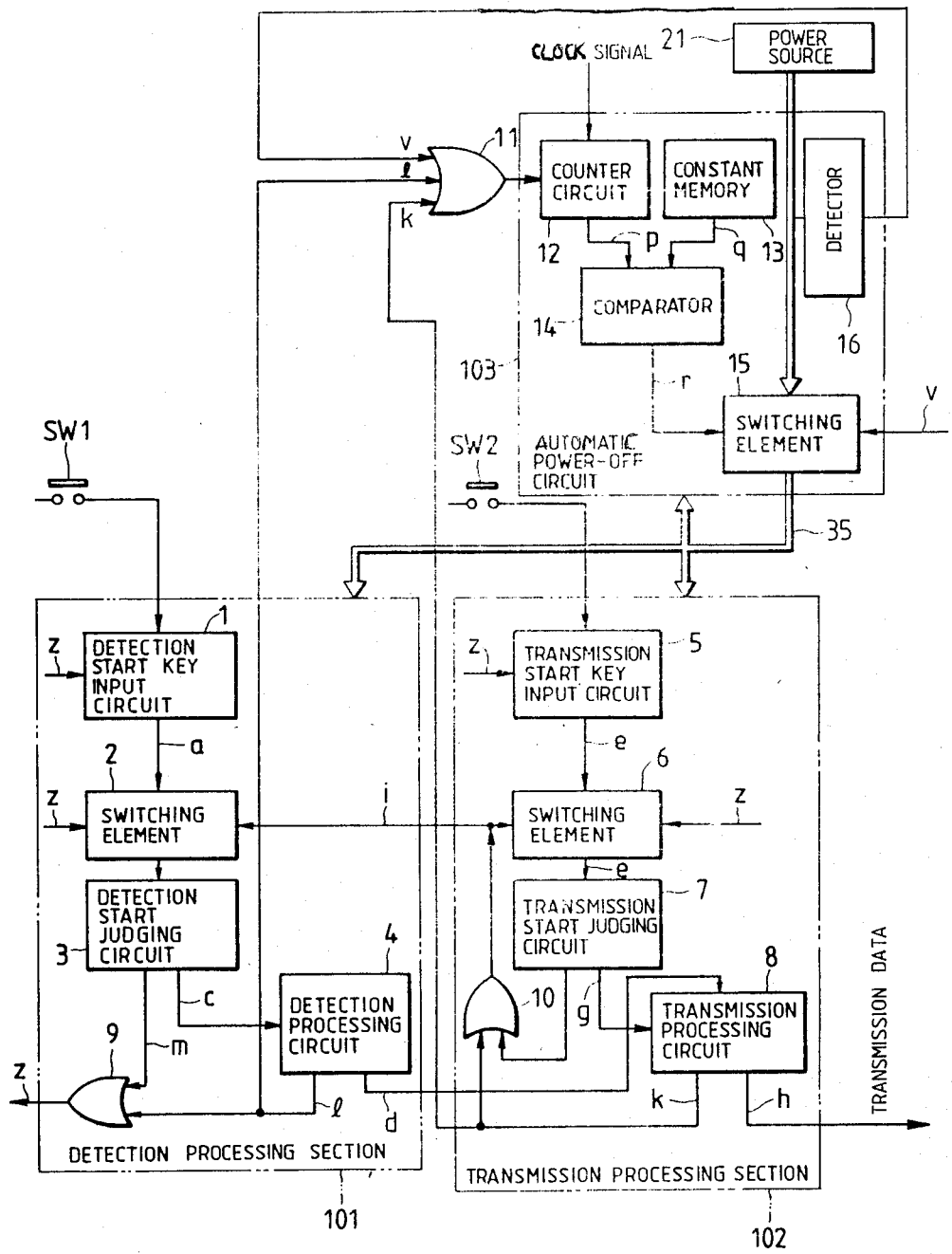

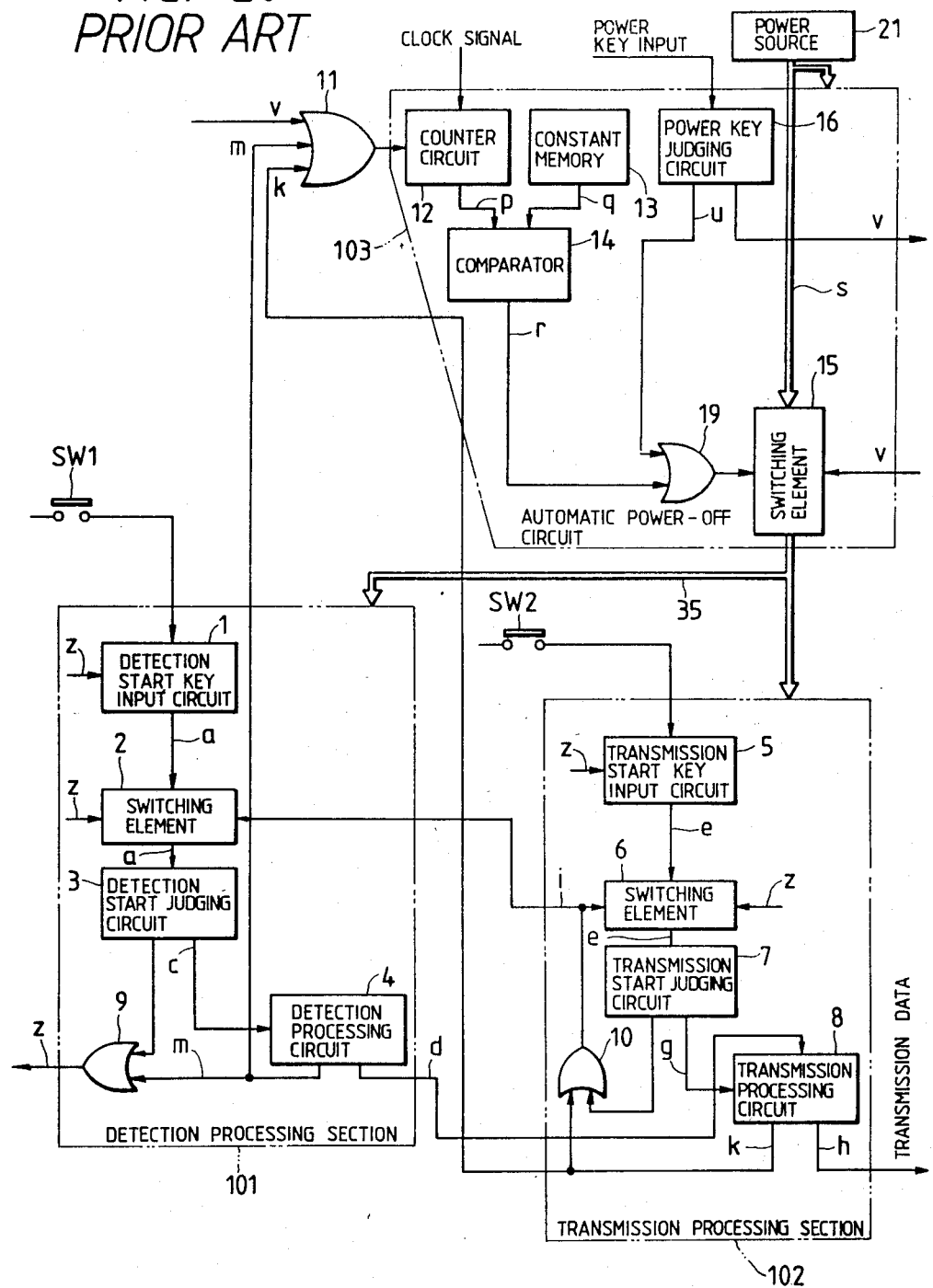

BAR-CODE REMOTE-CONTROL DEVICE

FIELD OF THE INVENTION

This invention relates to a bar-code remote-control device for detecting bar codes and transmitting their decoded data to a host apparatus.

The invention further relates to a bar-code remote-control device effecting an automatic power-off behavior matching with an operation.

The invention further relates to a bar-code remote-control device small in power consumption and reliable in operation.

The invention further relates to a bar-code remote-control device capable of reliably detecting bar codes.

The invention further relates to a bar-code remote-control device capable of reliably, stably detecting bar codes.

The invention further relates to a bar-code remote-control device in which a remote-control data signal is automatically transmitted after bar codes detection.

The invention further relates to a bar-code remote-control device ensuring stable bar code detection and stable remote-control data signal transmission.

BACKGROUND OF THE INVENTION

Prior art devices configured to detect bar codes on a medium and perform remote-control of motions of an operated apparatus based on the detected codes in a cordless mode (which device is hereinafter called "bar-code remote-control device) are disclosed in, for example, U.S. Pat. Nos. 3,826,900, 4,179,064, 4,240,064, 4,418,277, etc.

A bar-code detection device, in general, is supplied with a reference signal for detecting and outputting behaviors and a power supply from an operated apparatus having a host computer. In contrast, a "bar-code remote-control device" to which the invention is related involves a lot of problems to be solved particularly regarding signal processing of a signal to the power source because cordless data transmission is required. Prior art examples of such "bar-code remote-control device" are explained, referring to FIGS. 12 through 20.

A bar-code remote-control device configured to detect bar codes, make a remote-control data signal by decoding and encoding the detected data and transmit the remote-control data signal to a VTR or other host apparatus requiring a remote control in a cordless fashion has come to be used widely.

FIG. 13 is a block diagram showing a general arrangement of a bar-code remote-control device of this type in which power of a power source 23 is supplied to a controller section 20, bar-code detection processing section 21 and remote control data transmission processing section 22. The controller section 20 is connected to the bar-code detection processing section 21, remote-control data transmission processing section 22 and power source 23. An output terminal of the bar-code detection processing section 21 is connected to an input terminal of the remote-control data transmission processing section 22.

The controller section 20 has a first key SW1 for inputting a detection instructing signal and a second key SW2 for inputting a transmission instructing signal so that upon an operation against the first key SW1 and the second key SW2, behaviors of the bar-code detection processing section 21 and remote-control data transmission processing section 22 are controlled, and an automatic power-off control against the power source 23 is performed.

More specifically, upon an operation against the first key SW1 of the controller section 20, the bar-code detection processing section 21 detects and decodes a bar code 25 and makes a data signal. Upon an operation against the second key SW2 of the controller section 20, the remote-control data transmission processing section 22 is activated to take in the data signal from the bar-code detection processing section 21, make a remote-control data signal by encoding the data signal, and transmit it, for example, in the form of an optical signal to the host apparatus (not shown) via the air.

FIG. 12 is a block diagram for explaining a major arrangement of a prior art bar-code remote-control device of this type in which the controller section 20 includes a detection start input circuit 1, switching element 12, transmission start input circuit 5 and a switching element 16. The first key SW1 and the second key SW2 are connected to the detection start input circuit 1 and the transmission start input circuit 5, respectively. An output terminal of the detection start input circuit 1 is connected to an input terminal of the switching element 12 whereas an output terminal of the transmission start input circuit 5 is connected to an input terminal of the switching element 16, and a control terminal t21 of the switching element 12 and a control terminal t12 of the switching element 16 are connected to each other.

A signal line z from a processing signal terminal t8 of a transmission processing circuit 18 which will be described later is connected to a control terminal t01 of the detection start input circuit 1, control terminal t02 of the transmission start input circuit 5, control terminal t11 of the switching element 12 and control terminal t22 of the switching element 16.

The bar-code detection processing section 21 includes a detection start judging circuit 13 and a detection processing circuit 14. An output terminal of the switching element 12 is connected to an input terminal of the detection start judging circuit 13, and an active terminal t41 of the detection start judging circuit 13 is connected to a control terminal t6 of the detection processing circuit 14. A non-active terminal t31 of the detection start judging circuit 13 is connected to the control terminal t21 of the switching element 12 via a signal line j. A processed signal terminal t5 of the detection processing circuit 14 is connected to the control terminal t21 of the switching element 12 via the signal line j.

The remote-control data transmission processing section 22 includes a transmission start judging circuit 17 and a transmission processing circuit 18. An active terminal t42 of the transmission start judging circuit 17 is connected to a control terminal t10 of the transmission processing circuit 18, and an input terminal of the transmission processing circuit 18 is connected to an output terminal of the detection processing circuit 14 via a signal line d. A processed signal terminal t8 of the transmission processing circuit 18 is connected to respective portions of the controller section 20 via a signal line z as described above. A remote-control data signal from an output of the transmission processing circuit 18 is entered in a host apparatus (not shown).

The above-described prior art bar-code remote-control device operates as described below.

When transmission of a remote-control data signal to a host apparatus is completed, after bar-code detection and subsequent encoding of an obtained data signal into the remote-control data signal in the bar-code remote-control device, a reset signal is entered in the controller section 20 from the processed signal terminal t8 of the transmission processing circuit 18 via the signal line z.

The detection start input circuit 1 and the transmission start input circuit 5 become operative in response to the reset signal, and are ready for memorizing input conditions of the first key SW1 and the second key SW2, respectively.

The reset signal also causes the switching element 12 to connect the signal lines a and b one another, and causes the switching element 16 to disconnect the signal lines e and f.

In this configuration, when a detection instructing signal is entered in the controller section 20 through an operation of the first key SW1, the detection start input circuit 1 memorizes that the first key SW1 has been operated at step S1 in the flow chart of FIG. 14, and a detection instructing signal is entered in the detection start judging circuit 13 via the signal line a, switching element 12 and signal line b.

Going ahead to step S2, it is judged whether the first key SW1 (detection start key) has been pushed or not, and when it is judged that a proper detection instructing signal has been entered in the detection start judging circuit 13, a drive signal is entered in the control terminal t6 of the detection processing circuit 14 from the active terminal t41.

Responsively to the drive signal, the bar-code detection processing section 21 starts bar-code detection, and going ahead to step S3 in the flow chart of FIG. 14, a sensor (not shown in FIG. 12) detects a bar code. A resulting detection signal is entered in the detection processing circuit 14 and decoded into a data signal. The data signal is subsequently stored in the detection processing circuit 14.

When bar-code detection processing of the bar-code detecting processing section 21 is completed in this fashion, a reset signal is entered in the control terminal t21 of the switching element 12 and the control terminal t12 of the switching element 16 via the signal line j from the processed signal terminal t5 of the detection processing circuit 14, and the switching element 12 disconnects the signal lines a and b whereas the switching element 16 connects the signal lines e and f. This condition is established by a reset signal entering from the non-active terminal t31 via the signal line j also when the detection start judging circuit 13 judges that the detection instructing signal is non-active.

Going ahead to step S4 in the flow chart of FIG. 14, it is judged whether the second key SW2 (transmission start key) has been pushed or not, namely, whether a transmission instructing signal has been entered or not in the transmission start judging circuit 17 via the signal line e, switching element 16 and signal line f in response to an operation against the second key SW2.

When it is acknowledged that a transmission instructing signal has been entered in the transmission start judging circuit 17 in step S4, the process goes ahead to step S5 where a drive signal is entered in the control terminal t10 of the transmission processing circuit 18 from the active terminal t42 of the transmission start judging circuit 17.

In receipt of the drive signal, the transmission processing circuit 18 becomes operative, and taking therein the aforementioned data signal stored in the detection processing circuit 14, produces a remote-control data signal by encoding the data signal using a carrier signal. The remote-control data signal is transmitted from the output terminal of the transmission processing circuit 18 to the host apparatus (not shown).

When transmission of the remote-control data signal from the remote-control data transmission processing section 22 to the host apparatus is completed, a reset signal is entered in the control terminal t01 of the detection start input circuit 1, control terminal t02 of the transmission start input circuit 5, control terminal t11 of the switching element 12 and control terminal t12 of the switching element 16 from the processed signal terminal t8 of the transmission processing circuit 18 via the signal line z, and the controller section 20 becomes a reset condition as described above. This condition is established by a reset signal entering from the non-active terminal t32 via the signal line z also when it is judged that the transmission instructing signal is non-active.

As described above, according to the prior art bar-code remote-control device, in response to operations against the first key SW1 and the second key SW2 of the controller section 20, the bar code 25 is detected in the bar-code detection processing section 21, and a data signal indicative of the detected bar code is changed into a remote-control data signal in the remote-control data transmission processing section 22 and transmitted to a host apparatus.

Similarly to the purpose explained regarding FIGS. 12 through 14, in order to prevent useless consumption of a power source battery, there is a bar-code remote-control device including an automatic power-off circuit among others configured to obtain a data signal by decoding a bar code, subsequently produce a remote-control data signal based on the data signal and transmit the remote control data signal to a host apparatus such as TV set or VTR.

FIG. 15 is a block diagram showing an arrangement of bar-code remote-control device of this prior art type in which to a detection processing section 101 for detecting and processing a bar code is connected a transmission processing section 102 which produces a remote-control data signal based on a data signal obtained in the detection processing section 101 and subsequently transmits the remote control data signal in the form of, for example, an optical signal to the host apparatus via the air. A power from a battery 21 is supplied to the detection processing section 101 and transmission processing section 102 via an automatic power-off circuit 10 which is supplied with a detection signal u of a power source detector 16 for detecting the on-condition of a power switch 20, operation signal a of the detection start key SW1 of the detection processing section 101 and operation signal e of the transmission start key SW2 of the transmission processing section 102.

In the aforementioned detection processing section 101, an output terminal of the detection start key SW1 is connected to an input terminal of a detection start key input circuit 1 whose output terminal is connected to an input terminal of a detection start judging circuit 3 via a switching element 2. An output terminal of the detection start judging circuit 3 is connected to a control terminal of a detection processing circuit 4.

In the aforementioned transmission processing section 102, an output terminal of a transmission start key SW2 is connected to an input terminal of a transmission start key input circuit 5 whose output terminal is connected to an input terminal of a transmission start judging circuit 7 via a switching element 6. An output terminal of the transmission start judging circuit 7 is connected to a control terminal of a transmission processing circuit 8.

A processing completion signal z of the detection processing circuit 4 controls the detection start key input circuit 1, switching element 2, transmission start key input circuit 5 and switching element 6. The switching elements 2 and 6 are also controlled by a processing completion signal i of the transmission processing circuit 8.

The automatic power-off circuit 103 includes an OR circuit 11 whose output terminal is connected to a control terminal of a counter circuit 12 for counting clocks CLK. An output terminal of the counter circuit 12 and an output terminal of a constant memory 13 are connected to respective input terminals of a comparator 14 whose output terminal is connected to a switching element 15.

The switching element 15 is supplied with a power from the battery 21 via the power switch 20. Upon an on-action of the power switch 20, the switching element 15 transmits the power from the battery 21 to the detection processing section 101 and transmission-processing section 102.

There is further provided the power source detector 16 for detecting the on-condition of the power switch 20. The OR circuit 11 is supplied with a detection signal u of the power source detector 16, operation signal a of the detection start key SW1 obtained at the output terminal of the detection start key input circuit 1 and operation signal e of the transmission start key SW2 obtained at the output terminal of the transmission start key input circuit 5.

When the logic value of the signal at the output terminal of the OR circuit 11 becomes "1", the counter circuit 12 is reset to count clocks CLK, and when the count value reaches a predetermined count value q stored in the constant memory 13, the comparator 14 produces an interruption signal r which activates the switching element 15 to interrupt power supply from the battery 21 to the detection processing section 101 and transmission processing section 102 and simultaneously turn off the power switch 20.

In the above-arranged prior art bar-code remote-control device, when the power switch 20 is turned on, a voltage of the battery 21 is supplied to the detection processing section 101 and transmission processing section 102 via the switching element 15.

Concurrently, the power source detector 16 detects the on-condition of the power switch 20, and the detection signal u is entered in the OR circuit 11. Therefore, the counter circuit 12 is reset to start counting clocks CLK.

An actual count value p of the counter circuit 12 reaches the count value q stored in the constant memory 13, an interruption signal is produced from the comparator 14. Therefore, the switching element 15 is switched so as to interrupt power supply from the battery 21 to the detection processing section 101 and transmission processing section 102.

During a normal operation, after the power switch 20 is turned on, the detection start key SW1 and the transmission start key SW2 are operated to perform detection processing of a bar code and transmission processing of a remote-control data signal.

In this case, if the transmission start key SW2 is operated later, power is supplied from the battery 21 to the detection processing section 101 and the transmission processing section 102 for a total time summing a time from the beginning of the counting of the counter circuit 12 subsequent to application of the operation signal e to the OR circuit 11 until arrival of the constant memory 13 at the stored count value q (for example, 25 seconds) and a time from the on-action of the power switch 20 until the operation against the transmission start key SW2.

In the bar-code remote-control device, by entering the operation signal a in the detection start judging circuit 3 from the detection start key input circuit 1 via the switching element 2 held in its on-condition in receipt of the processing completion signal i and entering the drive signal c in the detection processing circuit 4, bar code detection is performed, and the data signal d is obtained which data signal d is stored in the detection processing circuit 4.

When detection processing of the bar code by the detection processing section 101 is completed, the switching element 6 is turned on by the processing completion signal z produced from the detection processing circuit 4, the operation signal e is entered in the transmission start judging circuit 7 from the transmission start key input circuit 5, and the drive signal g is entered in the transmission processing circuit 8. Thereby the transmission processing section 102 starts its transmitting motion.

That is, the data signal d is taken in the transmission processing circuit 8 which responsively produces a remote-control data signal h based on the data signal d, and the remote control data signal h is transmitted to a host apparatus.

FIG. 16 is a block diagram of a prior art arrangement of bar-code remote-control device of a similar type having the purpose explained above with reference to FIGS. 12 through 15. This bar-code remote-control device includes an automatic power-off circuit 103, a detection processing section 101 and a transmission processing section 102. To the automatic power-off circuit 103 are connected a battery 21, power switch 20 and power source detector 16 for detecting the on-motion of the power switch 20.

The automatic power-off circuit 103 includes an OR circuit 11, counter circuit 12, constant memory 13, comparator 14 and switching element 15. Their connection is such that when the power switch 20 is entered, the switching element 15 is turned on, and a first reset signal u is entered in the OR circuit 11 from the power source detector 16, and such that responsively to the on-action of the switching element 15, power is supplied from the battery 21 to the automatic power-off circuit 103, detection processing section 101 and transmission processing section 102 via a power line 35.

The detection processing section 101 includes a detection start key input circuit 1, switching element 2, detection start judging circuit 3, detection processing circuit 4 and OR circuit 9 which are connected so that upon an operation against the detection start key SW1, an operation signal a is entered in the detection start judging circuit 3 from the detection start key input circuit 1 via the switching element 2. When a drive signal c is entered in the detection processing circuit 4 from the detection start judging circuit 3, bar-code detection is performed in the detection processing circuit 4, and a data signal d obtained therefrom is stored in the detection processing circuit 4.

Further connection in the detection processing section 101 is such that when bar-code detection of the detection processing circuit 4 is completed, a second reset signal l is entered the OR circuit 11 and OR circuit 9 from the detection processing circuit 4.

The transmission processing section 102 includes a transmission start key input circuit 5, switching element 6, transmission start judging circuit 7, transmission processing circuit 8 and OR circuit 10 which are connected so that upon an operation against the detection start key SW2 an operation signal e from the transmission start key input circuit 5 is entered in the transmission start judging circuit 7 via the switching element 6. When a drive signal g is entered in the transmission processing circuit 8 from the transmission start judging circuit 7, the transmission processing circuit 8 detects a data signal d from the detection processing circuit 4 and produces a remote-control data signal h which is subsequently transmitted to a host apparatus.

Further connection in the transmission processing section 102 is such that when transmission of the remote-control data signal from the transmission processing circuit 8 is completed, a third reset signal k from the transmission processing circuit 8 is entered in the OR circuit 11 and the OR circuit 10.

In the above-arranged bar-code remote-control device, when an operator turns on the power switch 20, the switching element 15 of the automatic power-off circuit 103 is turned on, and power supply from the battery 21 to the detection processing section 101 and transmission processing section 102 is started.

When the counter circuit 12 starts its counting in response to entrance of the first reset signal u to the OR circuit 11 from the power source detector 16, and when an actual count value p reaches a predetermined count value q (for example, 25 seconds) established in the constant memory 13, an interruption signal r produced from the comparator 14 turns off the switching element 15, and power supply to the detection processing section 101 and transmission processing section 102 is interrupted.

However, when the operator turns on the detection start key SW1 during the operating process of the bar-code remote-control device, an operation signal a is entered in the detection start judging circuit 3 via the switching element 2.

When the detection start judging circuit 3 judges that the operation signal a is normal, the detection processing circuit 4 is activated by the drive signal c from the detection start judging circuit 3 to detect the bar code and obtain a data signal d which is subsequently stored in the detection processing circuit 4. When the detection processing circuit 4 completes the bar code detection, the second reset signal l is entered in the OR circuit 11 from the detection processing circuit 4. Therefore, the counter circuit 12 is reset to start its counting responsively from the moment until an actual count value p reaches the predetermined value q (for example, 25 seconds) again.

When the operator subsequently turns on the transmission start key SW2, an operation signal e is entered in the transmission start judging circuit 7 via the switching element 6.

When the transmission start judging circuit 7 judges that the operation signal e is normal, a driving signal q from the transmission start judging circuit 7 activates the transmission processing circuit 8 to take therein the data signal d from the detection processing circuit 4 and encode the data signal d into a remote-control data signal h which is transmitted to a host apparatus subsequently.

When the transmission processing circuit 8 completes transmission of the remote-control data h, a third reset signal k is entered in the OR circuit 11 from the transmission processing circuit 8. Therefore, the counter circuit 12 is reset to start its counting from the moment until an actual count value p reaches the predetermined count value q (for example, 25 seconds) again.

As described, in the bar-code remote-control device of FIG. 16, power supply from the battery 21 to the detection processing section 101 and transmission processing section 102 is interrupted a predetermined time (for example, 25 seconds) later than the last entered reset signal in the OR circuit 11 among the first reset signal u, second reset signal l and third reset signal k.

Therefore, since an operator can perform, for example, detection processing and transmission processing operations over many times, in a deliberate manner, without repeating operation against the power switch 21, he can operate the bar-code remote-control device efficiently and smoothly.

FIG. 17 is a circuit diagram showing a prior art arrangement of bar-code remote-control device of this type having the purpose explained above with reference to FIGS. 12 through 16. Reference numeral 101 refers to a detection processing section, 102 to a transmission processing section and 103 to an automatic power-off circuit. Further, reference numeral 3 refers to a detection start judging circuit, 4 to a detection processing circuit, 7 to a transmission start judging circuit, 8 to a transmission processing circuit, 11 to an OR circuit, 12 to a counter circuit, 13 to a constant memory, 14 to a comparator, 15 to a switching element, 16 to a power key judging circuit, and 21 to a power source.

This bar-code remote-control device includes the automatic power-off circuit 103, detection processing section 101 and transmission processing section 102, and the power source 21 is connected to the automatic power-off circuit 103 to supply a power to the detection processing section 101 and transmission processing section 102 through an operation against a power key (not shown).

The automatic power-off circuit 103 includes the counter circuit 12, constant memory 13, comparator 14, power key judging circuit 16, OR circuit 19 and switching element 15, and the OR circuit 11 is connected to the automatic power-off circuit 103. Upon an operation against the power key, the switching element 15 is turned on by an ON signal v from the power key judging circuit 16, and at the same time, the signal v is entered in the OR circuit 11 as a first reset signal v to clear the counter circuit 12 and make it start its counting. By a cutting operation of the power key, an OFF signal u is entered in the switching element 15 via the OR circuit 19 from the power key judging circuit 16 to turn off the switching element 15. Further, by an ON operation of the switching element 15, power is supplied from the power source 21 to the detection processing section 101 and transmission processing section 102 through a power line 35.

The detection processing section 101 includes a detection start key input circuit 1, switching element 2, detection start judging circuit 3, detection processing circuit 4 and OR circuit 9, and their connection is such that upon an operation against the detection start key SW1 an operation signal a is entered in the detection start judging circuit 3 from the detection start key input circuit 1 via the switching element 2. In response to application of a driving signal c to the detection processing circuit 4 from the detection start judging circuit 3, bar-code detection is performed in the detection processing circuit 4, and a data signal d is obtained. The data signal d is taken and memorized in the transmission processing circuit 8.

Further connection in the detection processing circuit 101 is such that when the bar-code detection processing by the detection processing circuit 4 is completed, a second reset signal 1 from the detection processing circuit 4 is entered through the OR circuit 11 and OR circuit 9 as a signal z to the detection start key input circuit 1 and switching elements 2 and 6.

The transmission processing section 102 includes a transmission start key input circuit 5, switching element 6, transmission start judging circuit 7, transmission processing circuit 8 and OR circuit 10, and their connection is such that upon an operation against the detection start key SW2 an operation signal e is entered in the transmission start judging circuit 7 from the transmission start key input circuit 5 via the switching element 6. Upon application of a driving signal g from the transmission start judging circuit 7 to the transmission processing circuit 8, the transmission processing circuit 8 produces a remote-control data signal h from the data signal d, and the remote-control data signal h is transmitted to a host apparatus.

Further connection in the transmission processing section 102 is such that when transmission of the remote-control data signal h by the transmission processing circuit 8 is completed, a third reset signal k from the transmission processing circuit 8 is entered through the OR circuit 11 and OR circuit 10 as a signal i in the switching elements 2 and 6.

In the above-arranged bar-code remote-control device, when an operator enters the power key (not shown), the switching element 15 of the automatic power-off circuit 103 is turned on by the first reset signal v of the power key judging circuit 16, and power supply from the power source 21 to the detection processing section 101 and transmission processing section 102 is commenced.

The first reset signal v is entered in the OR circuit 11 from the power key judging circuit 16, and the counter circuit 12 is cleared and starts its counting. When the count value p reaches a predetermined count value q (for example, 25 seconds) stored in the constant memory 13, an interruption signal r is entered in the switching element 15 from the comparator 14 via the OR circuit 19 and turns off the switching element 15, so that power supply to the detection processing section 101 and transmission processing section 102 is interrupted.

When the operator turns on the detection start key SW1 during the operation of the bar-code remote-control device, an operation signal a is entered in the detection start judging circuit 3 via the switching element 2. When the detection start judging circuit 3 judges that the operation signal a from the detection start key input circuit 1 is normal, the detection processing circuit 4 is activated by a driving signal c from the detection start judging circuit 3 to detect the bar code and obtain a data signal d which is subsequently memorized in the transmission processing circuit 8. When the detection processing circuit 4 completes its bar-code detection, the second reset signal 1 is entered in the OR circuit 11 from the detection processing circuit 4, and the counter circuit 12 is reset responsively to start its counting from this moment until a new count value p reaches the predetermined count value q (for example, 25 seconds).

When the operator turns on the transmission start key SW2, an operation signal e is entered in the transmission start judging circuit 7 via the switching element 6 as described above.

When the transmission start judging circuit 7 judges that the operation signal e is normal, the transmission processing circuit 8 is activated by a driving signal g from the transmission start judging circuit 7, and produces a remote-control signal h by encoding the data signal d. The remote-control signal h is transmitted to a host apparatus.

When the transmission processing circuit 8 completes transmission of the remote-control signal h, a third reset signal k is entered in the OR circuit 11 from the transmission processing circuit 8. Therefore, the counter circuit 12 is reset, and starts a new counting from this moment until the new count value p reaches the predetermined count value q (for example, 25 seconds).

As described, in the bar-code remote-control device of FIG. 17, power supply from the power source 21 to the detection processing section 101 and transmission processing section 102 is interrupted a predetermined time (for example, 25 seconds) later than the last entered reset signal in the OR circuit 11 among the first reset signal v, second reset signal 1 and third reset signal k.

Therefore, since an operator can perform, for example, detection processing and transmission processing operations over many times, in a deliberate manner, without repeating operations against the power switch 21, he can operate the bar-code remote-control device efficiently and smoothly.

FIG. 18 is a block diagram showing a prior art arrangement of bar-code remote-control device of a similar type having the purpose explained above with reference to FIGS. 12 through 17. The bar-code remote-control device consists of an automatic power-off circuit 103, detection processing section 101 and transmission processing section 102, and a power source 21 is connected to the automatic power-off circuit 103 to supply power to the detection processing section 101 and transmission processing section 102 upon an operation against a power key (not shown).

The automatic power-off circuit 103 consists of the counter circuit 12, constant memory 13, comparator 14, power key judging circuit 16, OR circuit 19 and switching element 15, and the OR circuit 11 is connected to the automatic power-off circuit 103. Upon an operation against the power key, the switching element 15 is turned on, and a first reset signal v concurrently enters in the OR circuit 11. By a cutting operation of the power key, an OFF signal u is entered in the switching element 15 via an OR circuit 19 from the power key judging circuit 16 to turn off the switching element 15. Further, by an ON operation of the switching element 15, power is supplied from the power source 21 to the detection processing section 101 and transmission processing section 102 through a power line 35.

The detection processing section 101 includes a detection start key input circuit 1, switching element 2, detection start judging circuit 3, detection processing circuit 4 and OR circuit 9, and their connection is such that upon an operation against the detection start key SW1 an operation signal a is entered in the detection start judging circuit 3 from the detection start key input circuit 1 via the switching element 2. In response to application of a driving signal c to the detection processing circuit 4 from the detection start judging circuit 3, bar-code detection is performed in the detection processing circuit 4, and a data signal d is obtained. The data signal d is taken and memorized in the transmission processing circuit 8.

Further connection in the detection processing section 101 is such that when the bar-code detection processing by the detection processing circuit 4 is completed, a second reset signal m from the detection processing circuit 4, in the form of an output z of the OR circuits 11 and 9, is entered in the transmission start key input circuit 5 and switching elements 2 and 6.

The transmission processing section 102 includes a transmission start key input circuit 5, switching element 6, transmission start judging circuit 7, transmission processing circuit 8 and OR circuit 10, and their connection is such that upon an operation against the detection start key SW2 an operation signal e is entered in the transmission start judging circuit 7 from the transmission start key input circuit 5 via the switching element 6. Upon application of a driving signal g from the transmission start judging circuit 7 to the transmission processing circuit 8, the transmission processing circuit 8 produces a remote-control data signal h from the data signal d, and the remote-control data signal h is transmitted to a host apparatus.

Further connection in the transmission processing section 102 is such that when transmission of the remote-control data signal h by the transmission processing circuit 8 is completed, a third reset signal k from the transmission processing circuit 8 is supplied to the OR circuits 10 and 11, and at the same time, an output i is entered in the switching elements 2 and 6 from the OR circuit 10.

In the above-arranged bar-code remote-control device, when an operator enters the power key (not shown), a first reset signal v is produced from the power key judging circuit 16, and the switching element 15 of the automatic power-off circuit 103 is turned on by the signal v. As a result, power supply from the power source 21 to the detection processing section 101 and transmission processing section 102 is commenced.

The first reset signal v is concurrently entered in the OR circuit 11 from the power key judging circuit 16, and the counter circuit 12 is cleared and starts its counting. When the count value p reaches a predetermined count value q (for example, 25 seconds) stored in the constant memory 13, an interruption signal r is entered in the switching element 15 from the comparator 14 via the OR circuit 19 and turns off the switching element 15, so that power supply to the detection processing section 101 and transmission processing section 102 is interrupted.

When the operator turns on the detection start key SW1 during the operation of the bar-code remote-control device, an operation signal a is entered in the detection start judging circuit 3 via the switching element 2. When the detection start judging circuit 3 judges that the operation signal a is normal, the detection processing circuit 4 is activated by a driving signal c from the detection start judging circuit 3 to detect a bar code and obtain a data signal d which is subsequently memorized in the transmission processing circuit 8. When the detection processing circuit 4 completes its bar-code detection, the second reset signal m is entered from the detection processing circuit 4, and the counter circuit 12 is reset responsively to start its counting from this moment until a new count value p reaches the predetermined count value q (for example, 25 seconds).

When the operator subsequently turns on the transmission start key SW2, an operation signal e is entered in the transmission start judging circuit 7 via the switching element 6.

When the transmission start judging circuit 7 judges that the operation signal e is normal, the transmission processing circuit 8 is activated by a driving signal g from the transmission start judging circuit 7, and produces a remote-control data signal h by encoding the data signal d. The remote-control data signal h is transmitted to a host apparatus.

When the transmission processing circuit 8 completes transmission of the remote-control data signal h, a third reset signal k is entered in the OR circuit 11 from the transmission processing circuit 8. Therefore, the counter circuit 12 is reset, and starts a new counting from this moment until the new count value p reaches the predetermined count value q (for example, 25 seconds).

As described, in the bar-code remote-control device of FIG. 18, power supply from the power source 21 to the detection processing section 101 and transmission processing section 102 is interrupted a predetermined time (for example, 25 seconds) later than the last entered reset signal in the OR circuit 11 among the first reset signal v, second reset signal m and third reset signal k.

Therefore, since an operator can perform, for example, detection processing and transmission processing operations over many times, in a deliberate manner, without repeating operations against the power switch, he can operate the bar-code remote-control device efficiently and smoothly.

FIG. 19 is a block diagram showing a prior art arrangement of bar-code remote-control device of a similar type having the purpose explained above with reference to FIGS. 12 through 18. The bar-code remote-control device consists of an automatic power-off circuit 103, detection processing section 101 and transmission processing section 102, and a power source 21 is connected to the automatic power-off circuit 103 to supply power to the detection processing section 101 and transmission processing section 102 upon an operation against a power key (not shown).

The automatic power-off circuit 103 includes a counter circuit 12, constant memory 13, comparator 14, detector 16 and switching element 15, and an OR circuit 11 is connected to the automatic power-off circuit 103. Upon an on-action of the power key, a first reset signal v is outputted from the detector 16, and the first reset signal v turns on the switching element 15 and concurrently enters in the OR circuit 11. Further, by an on-action of the switching element 15, power is supplied from the power source 21 to the detection processing section 101 and transmission processing section 102 via a power line 35.

The detection processing section 101 includes a detection start key input circuit 1, switching element 2, detection start judging circuit 3, detection processing circuit 4 and OR circuit 9, and their connection is such that upon an operation against the detection start key SW1 an operation signal a is entered in the detection start judging circuit 3 from the detection start key input circuit 1 via the switching element 2. In response to application of a driving signal c to the detection processing circuit 4 from the detection start judging circuit 3, bar-code detection is performed in the detection processing circuit 4, and a data signal d is obtained. The data signal d is taken and memorized in the transmission processing circuit 8.

Further connection in the detection processing section 101 is such that when the bar-code detection processing by the detection processing circuit 4 is completed, a second reset signal 1 from the detection processing circuit 4 is applied directly to the OR circuit 11 and indirectly in the form of an output Z of the OR circuit 9 to the detection start key input circuit 1, transmission start key input circuit 5 and switching elements 2 and 6.

The transmission processing section 102 includes a transmission start key input circuit 5, switching element 6, transmission start judging circuit 7, transmission processing circuit 8 and OR circuit 10, and their connection is such that upon an operation against the detection start key SW2 an operation signal e is entered in the transmission start judging circuit 7 from the transmission start key input circuit 5 via the switching element 6. Upon application of a driving signal g from the transmission start judging circuit 7 to the transmission processing circuit 8, the transmission processing circuit 8 produces a remote-control data signal h from the data signal d, and the remote-control data signal h is transmitted to a host apparatus.

Further connection in the transmission processing section 102 is such that when transmission of the remote-control data signal h by the transmission processing circuit 8 is completed, a third reset signal k from the transmission processing circuit 8 is entered in the switching elements 2 and 6 in the form of an output i of the OR circuit 10 via the OR circuit 11, transmission start key input circuit 5 and OR circuit 10.

In the above-arranged bar-code remote-control device, when an operator enters the power key (not shown), the switching element 15 of the automatic power-off circuit 103 is turned on, and power supply from the power source 21 to the detection processing section 101 and transmission processing section 102 is commenced.

Subsequently, a first reset signal v from the detector 16 is entered in the OR circuit 11, and the counter circuit 12 starts its counting. When the count value p reaches a predetermined count value q (for example, 25 seconds) stored in the constant memory 13, an interruption signal r is outputted from the comparator 14, and the switching element 15 is turned off, so that power supply to the detection processing section 101 and transmission processing section 102 is interrupted.

When the operator turns on the detection start key SW1 during the operation of the bar-code remote-control device, an operation signal a is entered in the detection start judging circuit 3 via the switching element 2. When the detection start judging circuit 3 judges that the operation signal a from the detection stare key input circuit 1 is normal, the detection processing circuit 4 is activated by a driving signal c for the detection start judging circuit 3 to detect the bar code and obtain a data signal d which is subsequently memorized in the transmission processing circuit 8. When the detection processing circuit 4 completes its bar-code detection, the second reset signal 1 is entered in the OR circuit 11 from the detection processing circuit 4, and the counter circuit 12 is reset responsively to start its counting from this moment until a new count value p reaches the predetermined count value q (for example, 25 seconds).

When the operator subsequently turns on the transmission start key SW2, an operation signal e is entered in the transmission start judging circuit 7 via the switching element 6.

When the transmission start judging circuit 7 judges that the operation signal e is normal, the transmission processing circuit 8 is activated by a driving signal q from the transmission start judging circuit 7, and produces a remote-control data signal h by encoding the data signal d. The remote-control data signal h is transmitted to a host apparatus.

When the transmission processing circuit 8 completes transmission of the remote-control data signal h, a third reset signal k is entered in the OR circuit 11 from the transmission processing circuit 8. Therefore, the counter circuit 12 is reset, and starts a new counting from this moment until the new count value p reaches the predetermined count value q ( for example, 25 seconds).

As described, in the bar-code remote-control device of FIG. 19, power supply from the power source 21 to the detection processing section 101 and transmission processing section 102 is interrupted a predetermined time (for example, 25 seconds) later than the last entered reset signal in the OR circuit 11 among the first reset signal v, second reset signal 1 and third reset signal k.

Therefore, useless power consumption of the power source 21 is prevented. Additionally, since an operator can perform, for example, detection processing and transmission processing operations over many times within a predetermined time, in a deliberate manner, without repeating operations against the power switch 21, he can operate the bar-code remote-control device efficiently and smoothly.

FIG. 20 is a block diagram showing a prior art arrangement of bar-code remote-control device of a similar type having the purpose explained above with reference to FIGS. 12 through 19. The bar-code remote-control device consists of an automatic power-off circuit 103, detection processing section 101 and transmission processing section 102, and a power source 21 is connected to the automatic power-off circuit 103 to supply power to the detection processing section 101 and transmission processing section 102 upon an operation against a power key (not shown).

The automatic power-off circuit 103 includes a counter circuit 12, constant memory 13, comparator 14, power key judging circuit 16, OR circuit 19 and switching element 15, and an OR circuit 11 is connected to the automatic power-off circuit 103. Upon an on-action of the power key, a first reset signal v is outputted from the power key judging circuit 16, and the signal v turns on the switching element 15. At the same time, the first reset signal v is entered in the OR circuit 11 and clears the counter circuit 12 to make it start a new counting. Further, by a cutting operation of the power key, an OFF signal u is entered in the switching element 15 from the power key judging circuit 16 via the OR circuit 19, and the switching element 15 is turned off by the OFF signal u. Additionally, in response to the ON action of the switching element 15, power is supplied from the power source 21 to the detection processing section 101 and transmission processing section 102 via a power line 35.

The detection processing section 101 includes a detection start key input circuit 1, switching element 2, detection start judging circuit 3, detection processing circuit 4 and OR circuit 9, and their connection is such that upon an operation against the detection start key SW1 an operation signal a is entered in the detection start judging circuit 3 from the detection start key input circuit 1 via the switching element 2. In response to application of a driving signal c to the detection processing circuit 4 from the detection start judging circuit 3, bar-code detection is performed in the detection processing circuit 4, and a data signal d is obtained. The data signal d is taken and memorized in the transmission processing circuit 8.

Further connection in the detection processing section 101 is such that when the bar-code detection processing by the detection processing circuit 4 is completed, a second reset signal m from the detection processing circuit 4 is applied directly to the OR circuit 11 and indirectly in the form of an output z of the OR circuit 9 to the detection start key input circuit 1, transmission start key input circuit 5 and switching elements 2 and 6.

The transmission processing section 102 includes a transmission start key input circuit 5, switching element 6, transmission start judging circuit 7, transmission processing circuit 8 and OR circuit 10, and their connection is such that upon an operation against the detection start key SW2 an operation signal e is entered in the transmission start judging circuit 7 from the transmission start key input circuit 5 via the switching element 6. Upon application of a driving signal g from the transmission start judging circuit 7 to the transmission processing circuit 8, the transmission processing circuit 8 produces a remote-control data signal h from the data signal d, and the remote-control data signal h is transmitted to a host apparatus.

Further connection in the transmission processing section 102 is such that when transmission of the remote-control data signal h by the transmission processing circuit 8 is completed, a third reset signal k from the transmission processing circuit 8 is entered in the OR circuits 10 and 11, and at the same time, an output j is entered in the switching elements 2 and 6 from the OR circuit 10.

In the above-arranged bar-code remote-control device, when an operator enters the power key (not shown), the switching element 15 of the automatic power-off circuit 103 is turned on, and power supply from the power source 21 to the detection processing section 101 and transmission processing section 102 is commenced.

Subsequently, the first reset signal v from the power key judging circuit 16 is entered in the OR circuit 11, and the counter circuit 12 starts its counting. When the count value p reaches a predetermined count value q (for example, 25 seconds) stored in the constant memory 13, an interruption signal r is entered in the switching element 15 from the comparator 14 via the OR circuit 19, and the switching element 15 is turned off, so that power supply to the detection processing section 101 and transmission processing section 102 is interrupted.

When the operator turns on the detection start key SW1 during the operation of the bar-code remote-control device, an operation signal a is entered in the detection start judging circuit 3 via the switching element 2. When the detection start judging circuit 3 judges that the operation signal a is normal, the detection processing circuit 4 is activated by a driving signal c from the detection start judging circuit 3 to detect the bar code and obtain a data signal d which is subsequently memorized in the transmission processing circuit 8. When the detection processing circuit 4 completes its bar-code detection, the second reset signal m is entered in the OR circuit 12 from the detection processing circuit 4, and the counter circuit 12 is reset responsively to start its counting from this moment until a new count value p reaches the predetermined count value q (for example, 25 seconds).

When the operator subsequently turns on the transmission start key SW2, an operation signal e is entered in the transmission start judging circuit 7 via the switching element 6.

When the transmission start judging circuit 7 judges that the operation signal e is normal, the transmission processing circuit 8 is activated by a driving signal g from the transmission start judging circuit 7, and produces a remote-control data signal h by encoding the data signal d. The remote-control data signal h is transmitted to a host apparatus.

When the transmission processing circuit 8 completes transmission of the remote-control data signal h, a third reset signal k is entered in the OR circuit 11 from the transmission processing circuit 8. Therefore, the counter circuit 12 is reset, and starts a new counting from this moment until the new count value p reaches the predetermined count value q (for example, 25 seconds).

As described, in the bar-code remote-control device of FIG. 20, power supply from the power source 21 to the detection processing section 101 and transmission processing section 102 is interrupted a predetermined time (for example, 25 seconds) later than the last entered reset signal in the OR circuit 11 among the first reset signal v, second reset signal m and third reset signal k.

Therefore, since an operator can perform, for example, detection processing and transmission processing operations over many times, in a deliberate manner, without repeating operations against the power switch 21, he can operate the bar-code remote-control device efficiently and smoothly.

In the above-described arrangements of bar-code remote-control devices, however, their cordless remote-control hand-held nature invites the following various problems caused by the use of a power source having a limited power.

More specifically, in the prior art bar-code remote-control device of FIGS. 12 through 14, the number of parts is reduced as far as possible, and respective parts are small-scaled as far as possible to meet a demand of scale reduction.

Therefore, in most cases, small-scaled keys are used as the first key SW1 and second key SW2, and they are disposed near one another to reduce their mounting space. In some such cases, the bar-code remote-control device is not provided with indication lamps indicative of these keys because of an insufficient mounting space therefor.

As described above, in the prior art bar-code remote-control device, the first and second keys SW1 and SW2 are operated, these operations are stored in the DSIC 1 and TSIC 5, respectively, this condition is judged first about the first key SW1 for entering a detection instructing signal and subsequently about the second key SW1 for entering a transmission instructing signal, and bar-code detection and transmission of a remote-control data signal based on a detected bar code are performed.

In the prior art bar-code remote-control device in which the small-scaled first and second keys SW1 and SW2 are located close to each other, there is a possibility that an operator, although intending to operate the first key SW1 first and the second key SW2 subsequently, erroneously operates both keys simultaneously.

When the first key SW1 and the second key SW2 are operated simultaneously, the detection start judging circuit 13 first judges the presence or absence of a detection instructing signal, and detection processing by the detection processing circuit 14 is effected as described before. Therefore, a data signal to be memorized in the detection processing circuit 14 in response to the operation against the first key SW1 is cancelled before it is transmitted as a remote-control data signal by the transmission processing circuit 18.

It is therefore a first object of the invention to provide a bar-code remote-control device in which a data signal already obtained by detection processing responsive to a prior operation against the first key is never cancelled by an erroneous operation such as simultaneous operations against the first key and the second key, so that a remote-control data signal is produced based on the data signal and the remote-control data signal is reliably transmitted to a host apparatus.

In the prior art bar-code remote-control device shown in FIG. 15, power supply from the battery 21 to the detection processing section 101 and transmission processing section 102 is interrupted a predetermined time later than operations against the detection start key SW1 and the transmission start key SW2.

Therefore, if it takes a time to select a required bar code, voltage supply of the battery 21 is often interrupted during detection processing in the detection processing section 101 or during transmission processing in the transmission processing section 102.

When voltage supply of the battery 21 is interrupted during detection processing or transmission processing, an operator must repeat an operation for turning on the power switch 20 again. This complicates the operation, and drops the operative efficiency of the bar-code remote-control device.

It is therefore a second object of the invention to provide a bar-code remote-control device in which power supply is not interrupted for a predetermined time after detection processing and transmission processing responsive to operations against the detection start key and transmission start key, so that reliable detection processing and transmission processing are performed in an efficient and smooth manner.

In the prior art bar-code remote-control device of FIG. 16, a data signal d has already been outputted to the transmission processing circuit 8 upon generation of a remote control data signal h and transmission thereof to a host apparatus by the transmission processing circuit 8, and power is still supplied from the battery 21 to the detection processing circuit 101 which already completed its processing. This is a useless power consumption.

Further, when the detection start judging circuit 3 judges that the operation signal a is normal, a driving signal c is immediately entered in the detection processing circuit 4 which responsively detects the bar code. However, when the power switch 20 and the detection start key SW1 are operated simultaneously, detecting motion is started before the detection processing circuit 4 is warmed up sufficiently, and this often invites unreliable detecting motion or erroneous detection.

It is therefore a third object of the invention to provide a bar-code remote-control device in which useless power supply to useless portions is stopped to prevent consumption of the battery to prolong the exchange interval of the battery so that reliable transmission of a remote-control data signal to a host apparatus is ensured even by a battery which already passed its normal life, and bar-code detection based on an instable motion upon the rising time is prevented.

In the prior art bar-code remote-control device of FIG. 17, when the power key is cut off from its conduction state, an OFF signal u is entered in the OR circuit 19 from the power key judging circuit 16 to turn off the switching element 15 and interrupt power supply from the power source 21 to the detection processing section 101 and transmission processing section 102. However, since this type of bar-code remote-control device is held in a user's hand and moved slidably on a bar code, chattering often occurs at the contacts of the power key, and the power key sometimes falls in a temporary or complete cut-off state during bar-code detection. It is known that such a cut-off phenomenum of the power key often occurs when the contacts of the power key are worn out due to its secular variation.

When power supply from the power source 21 is interrupted by such a cut-off condition of the power key during bar-code detection, the preceding signal processing is invalidated. Therefore, a user must re-enter the power key and must start bar-code detection from the beginning.

It is therefore a fourth object of the invention to provide a bar-code remote-control device in which even if the power key is cut off during bar-code detection, the bar-code detection is continued by preventing interruption of power supply from the power source by a power interruption preventing means and in which upon completion of bar-code detection, a back-up power supply means supplies power to the transmission processing section to make it perform its transmission processing without fail.

In the prior art bar-code remote-control device of FIG. 18, when the power source is cut off from its conduction state, an interruption signal u is entered in the OR circuit 19 from the power key judging circuit 16 to turn off the switching element 15 and interrupt power supply from the power source 21 to the detection processing section 101 and transmission processing section 102. However, since this type of bar-code remote-control device is manually moved slidably on a bar code, chattering often occurs at the contacts of the power key, and the power key sometimes falls in a cut-off condition during bar-code detection. It is known that such a cut-off phenomenum of the power key often occurs when the contacts of the power key are worn out due to its secular variation.

When power supply from the power source 21 is interrupted by the cut-off condition of the power key during bar-code detection, the preceding signal processing is invalidated even if the interruption is temporary. Therefore, a user must re-enter the power key and must start bar-code detection from the beginning.

It is therefore a fifth object of the invention to provide a bar-code remote-control device in which even if the power key is cut off during bar-code detection, a preventing means prevents interruption of power supply from the power source so that reliable and stable bar-code detection is performed.

In the prior art bar-code remote-control device of FIG. 19, the transmission start key SW2 must be operated in order to activate the transmission processing circuit 8 to produce a remote-control data signal h and transmit the remote-control data signal h to a host apparatus.

Operations against the transmission start key SW2 are a troublesome work for a user when signals are transmitted sequentially while independent multiple bar codes are detected.

It is therefore a sixth object of the invention to provide a bar-code remote-control device in which when a data signal obtained in the detection processing section is normal, an automatic transmitting means transmits a remote-control data signal from the transmission processing section to a host apparatus.

In the prior art bar-code remote-control device of FIG. 20, when the power source is cut off from its conduction state, an interruption signal u is entered in the OR circuit 19 from the power key judging circuit 16 to turn off the switching element 15 and interrupt power supply from the power source 21 to the detection processing section 101 and transmission processing section 102. However, since this type of bar-code remote-control device is manually moved slidably on a bar code, chaterring often occurs at the contacts of the power key, and the power key sometimes falls in a cut-off condition during bar-code detection. It is known that such a cut-off phenomenum of the power key often occurs when the contacts of the power key are worn out due to its secular variation.

When power supply from the power source 21 is interrupted by the cut-off condition of the power key during bar-code detection, the power key must be reentered to resume bar-code detection. Additionally, when the power key is once cut off, the preceding detection processing is invalidated by the cut-off condition even when conduction of the power key is restored. Therefore, re-entering operation against the power key is required as in the aforementioned case.

Further, the transmission start key SW2 must be operated every time when a remote-control data signal is transmitted to a host apparatus, and such operation is troublesome when transmission of a number of remote-control data signals is repeated independently.

It is therefore a seventh object of the invention to provide a bar-code remote-control device in which if the power key is cut off during bar-code detection, a preventing means prevents interruption of power supply from the power source so as to continue the bar-code detection, and upon completion of the bar-code detection, an automatic transmitting means causes the transmission processing section to transmit a remote-control data signal.

SUMMARY OF THE INVENTION

In order to achieve the objects, respective inventive technical means are arranged as follows.

A first inventive technical means for solution of the first object is directed to a bar-code remote-control device including: a controller section having a first key for entering a detection instructing signal and a second key for entering a transmission instructing signal; a bar code detection processing section connected to the controller section and activated by a detection instructing signal outputted from the controller section to detect a bar code and obtain a data signal; and a remote-control data transmission processing section connected to the controller section and activated by the transmission instructing signal outputted from the controller section to take therein the data signal from the bar code detection processing section and produce a remote-control data signal by encoding the data signal and transmit the remote-control data signal to a host apparatus, and the first inventive technical means is characterized in that the bar-code remote-control device includes a gate circuit which is opened after completion of the processing in the remote-control data transmission processing section to enter the detection instructing signal in the detection processing section.

A second inventive technical means for solution of the second object is directed to a bar-code remote-control device including: a detection processing section for detecting a bar code and obtaining a data signal; a transmission processing section configured to take therein the data signal obtained in the detection processing section to produce a remote-control data signal by encoding the data signal and transmit the remote-control data signal to a host apparatus; a power source for supplying power to the detection processing section and transmission processing section; a first detector means for detecting the said power supply and generating a first reset signal; and an automatic power-off circuit operative a predetermined time later than entrance of the first reset signal to shut off the power source in conduction state, and the second inventive technical means is characterized in that the bar-code remote-control device further comprises a second detector means for detecting completion of a processing in the detection processing section to generate a second reset signal, a third detector means for detecting completion of a processing in the transmission processing section to generate a third reset signal, said automatic power-off circuit being arranged so that when at least one of the second reset signal and third reset signal is entered in the automatic power-off circuit during a conduction period of the power source, said interruption is performed a predetermined time later than entrance technical means of the last entered reset signal.

A third inventive technical means for solution of the third object is directed to a bar-code remote-control device including: a detection processing section for detecting a bar code and obtaining a data signal; a transmission processing section configured to take therein the data signal obtained in the detection processing section, produce a remote-control data signal by encoding the data signal and transmit the remote-control data signal to a host apparatus; a power source for supplying power to the detection processing section and transmission processing section: a first detector means for detecting the said power supply and generating a first reset signal; a second detector means for detecting completion of a processing in the detection processing section and generating a second reset signal; a third detector means for detecting completion of a processing in the transmission processing section and generating a third reset signal; and an automatic power-off circuit operative a predetermined time later than entrance of the last entered reset signal among the first reset signal, second reset signal and third reset signal to shut off the power source in conduction state, the third inventive technical means is characterized in that the bar-code remote-control device further comprises a power control means causing the detection processing section to start its detection processing a predetermined time later than application of the first reset signal and responsive to initiation of the processing in the transmission processing section to interrupt power supply to the detection processing section during transmission processing.

A fourth inventive technical means for solution of the fourth object is directed to a bar-code remote-control device including: a detection processing section for detecting a bar code; a transmission processing section configured to take therein a data signal obtained in the detection processing section, produce a remote-control data signal by encoding the data signal and transmit it to a host apparatus; a power source responsive to operation against a power key to supply power to the detection processing section and transmission processing section; a first detector means for detecting the said power supply and generating a first reset signal; a second detector means for detecting completion of a processing in the detection processing section and generating a second reset signal; a third detector means for detecting completion of a processing in the transmission processing section and generating a third reset signal; and an automatic power-off circuit operative a predetermined time later than entrance of the last entered signal among the first reset signal, second reset signal and third reset signal to interrupt power supply from the power source, and the fourth inventive technical means is characterized in that the bar-code remote-control device further comprises a preventing means configured to prevent interruption of the power supply caused by a cut-off condition of the power key during bar-code detection until bar-code detection in the detection processing section is completed, and a back-up power supply means for supplying the transmission processing section with power from a back-up power source upon said interruption of the power supply.

A fifth inventive technical means for solution of the fifth object is directed to a bar-code remote-control device including: a detection processing section for detecting a bar code; a transmission processing section configured to take therein a data signal obtained in the detection processing section, produce a remote-control data signal by encoding the data signal and transmit it to a host apparatus; a power source responsive to operation against a power key to supply power to the detection processing section and transmission processing section; a first detector means for detecting the said power supply and generating a first reset signal; a second detector means for detecting completion of a processing in the detection processing section and generating a second reset signal; a third detector means for detecting completion of a processing in the transmission processing section and generating a third reset signal; and an automatic power-off circuit operative a predetermined time later than entrance of the last entered signal among the first reset signal, second reset signal and third reset signal to interrupt power supply from the power source, and the fifth inventive technical means is characterized in that the bar-code remote-control device further comprises a preventing means configured to prevent interruption of the power supply caused by a cut-off condition of the power key during bar code detection in the detection processing section until interruption responsive to the second reset signal.

A sixth inventive technical means for solution of the sixth object is directed to a bar-code remote-control device including: a detection processing section for detecting a bar code; a transmission processing section configured to take therein a data signal obtained in the detection processing section, produce a remote-control data signal by encoding the data signal and transmit it to a host apparatus; a power source responsive to operation against a power key to supply power to the detection processing section and transmission processing section; a first detector means for detecting the said power supply and generating a first reset signal; a second detector means for detecting completion of a processing in the detection processing section and generating a second reset signal; a third detector means for detecting completion of a processing in the transmission processing section and generating a third reset signal; and an automatic power-off circuit operative a predetermined time later than entered of the last entered signal among the first reset signal, second reset signal and third reset signal to interrupt power supply from the power source, and the sixth inventive technical means is characterized in that the bar-code remote-control device further comprises an automatic transmitting means which causes the transmission processing section to transmit the remote-control data signal to the host apparatus when the data signal obtained in the detection processing section is normal.

A seventh inventive technical means for solution of the seventh object is directed to a bar-code remote-control device including: a detection processing section for detecting a bar code; a transmission processing section configured to take therein a data signal obtained in the detection processing section, produce a remote-control data signal by encoding the data signal and transmit it to a host apparatus; a power source responsive to operation against a power key to supply power to the detection processing section and transmission processing section; a first detector means for detecting the said power supply and generating a first reset signal; a second detector means for detecting completion of a processing in the detection processing section and generating a second reset signal; a third detector means for detecting completion of a processing in the transmission processing section and generating a third reset signal; and an automatic power-off circuit operative a predetermined time later than entrance of the last entered signal among the first reset signal, second reset signal and third reset signal to interrupt power supply from the power source, and the seventh inventive technical means is characterized in that the bar-code remote-control device further comprises a preventing means for preventing interruption of the power supply when the power key is cut off during bar code detection in the detection processing section; and an automatic transmission processing means responsive to the second reset signal to make the transmission processing section perform its transmission processing.

The aforegoing respective inventive technical means operate as explained below.

According to the first technical means using the gate circuit which is opened after completion of the processing in the remote-control data transmission processing section to permit the detection instructing signal to enter in the detection processing section, when the bar code detection processing in the bar code detection processing section responsive to operation against the first key is completed, the gate circuit is closed, and entrance of the detection instructing signal in the detection processing section is prevented.

Therefore, also when the first key and the second key are operated simultaneously, a transmission instructing signal responsive to operation against the second key is merely entered in the remote-control data transmission processing section, and it never occurs that the detection instructing signal is entered in the detection processing section and cancels the preceding data signal.

In response to the transmission instructing signal, the remote-control data transmission processing section is activated to take therein the data signal from the detection processing section, produce a remote-control data signal based on the data signal and transmit it to the host apparatus.

Since the gate circuit is opened only after completion of a processing in the remote-control data transmission processing section, the data signal obtained in the bar code detection processing section is not canceled, and always reliable transmission of the remote-control data signal to the host apparatus is ensured.

According to the second technical means in which responsively to operation against the detection start key in a predetermined time after application of the power source to the device, the detection processing section performs its bar code detection, and a data signal obtained thereby is memorized. Upon completion of the detection processing by the detection processing section, a second reset signal is entered in the automatic power-off circuit from the second detector means.

When the transmission start key is operated within the aforementioned predetermined time, the transmission processing section is activated and takes therein the data signal from the detection processing section to produce a remote-control data signal based on the data signal and transmit it to the host apparatus. Upon completion of the transmission processing in the transmission processing section, a third reset signal is entered in the automatic power-off circuit from the third detector means.

Since the counter circuit of the automatic power-off circuit is reset by the second reset signal and the third reset signal to perform a new counting up to a predetermined count value, the power source is interrupted a predetermined time later than entrance of the last entered one of these reset signals.

Therefore, since the power source is interrupted a predetermined time later than completion of the detection processing in the detection processing section and transmission processing in the transmission processing section, an operator can effect his operation such as selection of the bar code with calmness and can effect reliable detection processing and transmission processing in an efficient and smooth manner.

According to the third technical means, the power switch is turned on to supply the device with power, and a predetermined time later than generation of a first reset signal from the first detector means, the power control means permits the detection processing section to start bar code detection. Thus the detection processing section which has been warmed up in the predetermined time after power supply from the battery operates reliably and performs bar code detection without error.

When the transmission processing section takes therein a data signal from the detection processing section and starts generation of a remote-control data signal and transmission processing of the remote-control data signal to a host apparatus, power supply to the detection processing section is interrupted by the power control means during the transmission processing. Therefore, useless power consumption is completely prevented.

According to the fourth technical means, when the power key is cut off, even if temporarily, during bar code detection in the detection processing section, the preventing means is activated to prevent interruption of power supply. When power supply from the power source is subsequently interrupted by a second reset signal from the second detector means upon completion of bar code detection in the detection processing section, the back-up power supply means supplies power from the back-up power source to the transmission processing section, and the transmission processing section continues transmission processing.

According to the fifth technical means, when the power key is cut off during bar code detection in the detection processing section, the preventing means is activated so that interruption of power supply by the automatic power-off circuit is prevented until interrupting action responsive to a second reset signal. The second reset signal is generated upon completion of bar code detection in the detection processing section, and power supply is interrupted a predetermined time later than entrance of the second reset signal to the automatic power-off circuit. Therefore, bar code detection is performed reliably and stably.

According to the sixth technical means, when the detection processing section detects a bar code and obtains a data signal, and when the data signal is normal, the transmission processing section driven by the automatic transmitting means produces a remote-control data signal, and this signal is transmitted to a host apparatus.

In this fashion, transmission processing is effected automatically without operating the transmission start key, and an operator can operate the device efficiently.

According to the seventh technical means, when the power key is cut off during bar code detection in the detection processing section, the preventing means is activated to prevent interruption of power supply by the automatic power-off circuit. When bar code detection in the detection processing section is completed, a predetermined time for power supply is established by a second reset signal from the second detector means, and at the same time, the transmission processing section is activated to start generation of a remote-control data signal and transmission thereof to the host apparatus.

In this fashion, even if the power key is cut off during bar code detection, power supply from the power source is never interrupted until the bar code is detected by the detection processing section and subsequently transmitted by the transmission processing section. Further, the transmission processing section is driven automatically upon completion of bar code detection in the detection processing section, without operating the transmission start key every time.

BRIEF DESCRIPTION OF THE DRAWINGS

FIGS. 1 and 2 show an embodiment having a first technical means in which FIG. 1 is a circuit arrangement of an embodiment, and FIG. 2 is a flow chart to explain how the device of FIG. 1 operates;

FIGS. 5 and 6 show embodiment having a fourth technical means in which FIG. 5 is a circuit arrangement of an embodiment, and FIG. 6 is a fragmentary circuit arrangement of a further embodiment other than that of FIG. 5;

FIGS. 7 and 8(1) through 8(4) show an embodiment having a fifth technical means in which FIG. 7 is a circuit arrangement of an embodiment, and FIGS. 8(1) through 8(4) are timing charts showing the operation of the device of FIG. 7;

FIGS. 10 and 11(1) through 11(4) show an embodiment having a seventh technical means in which FIG. 10 is a circuit arrangement of an embodiment, and FIGS. 11(1) through 11(4) are timing charts showing the operation of the, device of FIG. 10; and FIGS. 12 through 20 are views for explanation of prior art devices.

DETAILED DESCRIPTION

Figure 1:
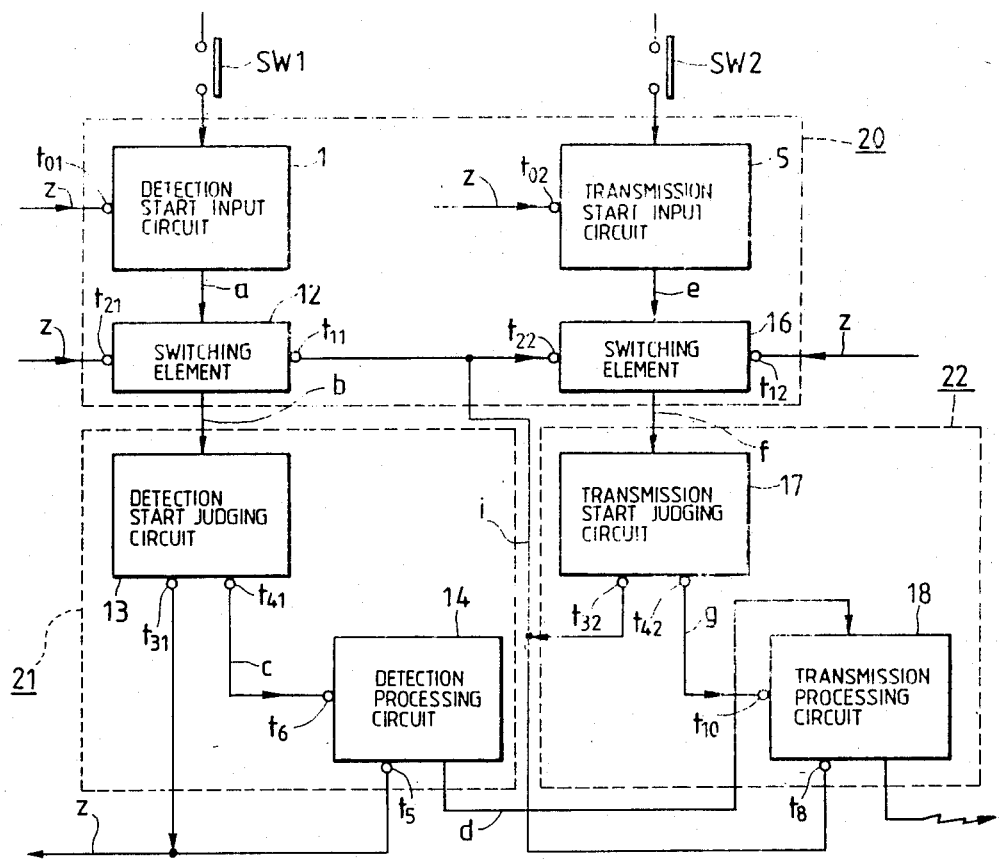

Embodiments of the invention having first to seventh technical means are described below in detail, referring to FIGS. 1 through 11.

The same arrangements and functionally equivalent portions to those in the prior art devices explained above referring to FIGS. 12 through 20 are designated by identical or related reference numerals, and their detailed explanation is omitted.

An embodiment having the first technical means is described below, referring to FIGS. 1 and 2.

Figure 2:
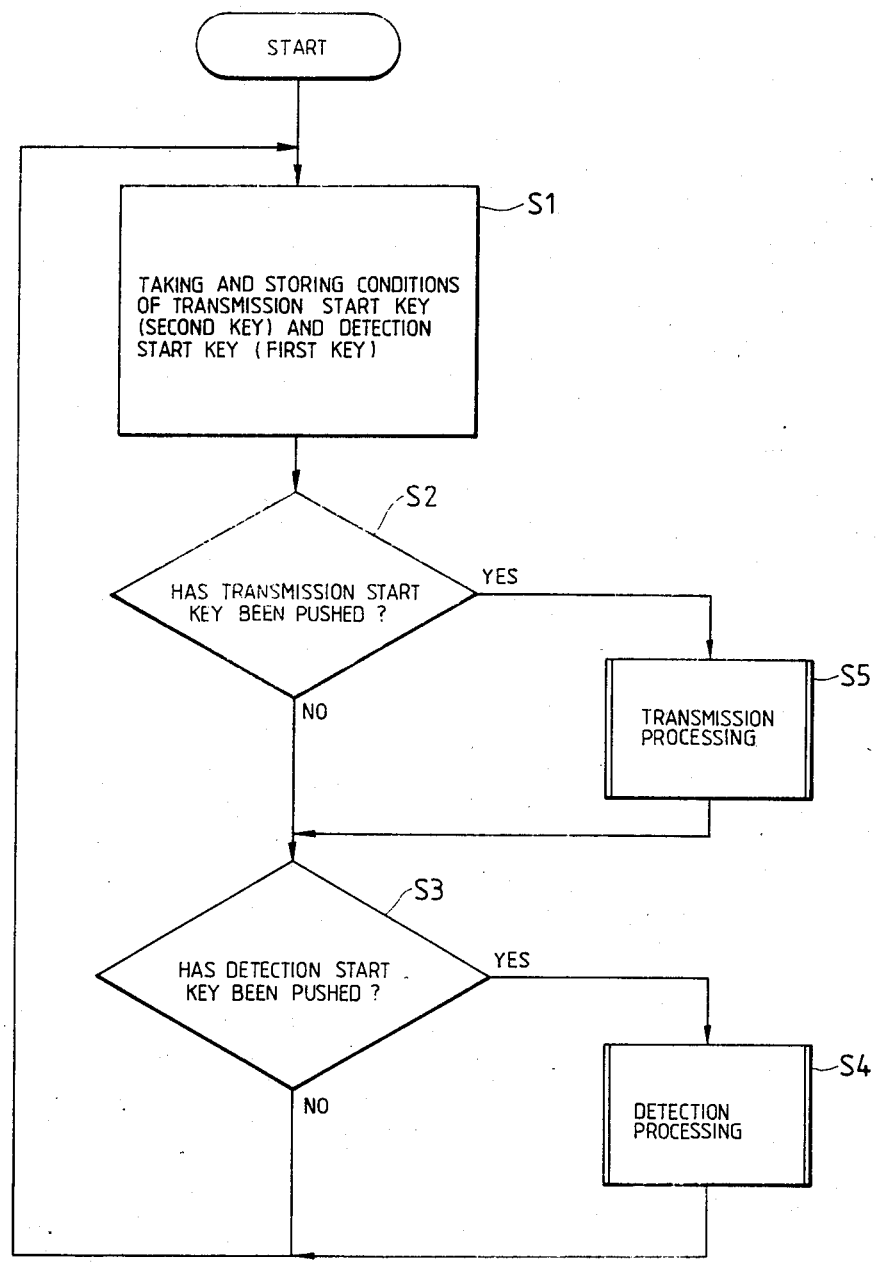

FIG. 1 is a circuit arrangement showing an embodiment, and FIG. 2 is a flow chart for explaining how the device of FIG. 1 operates.

Figure 12:
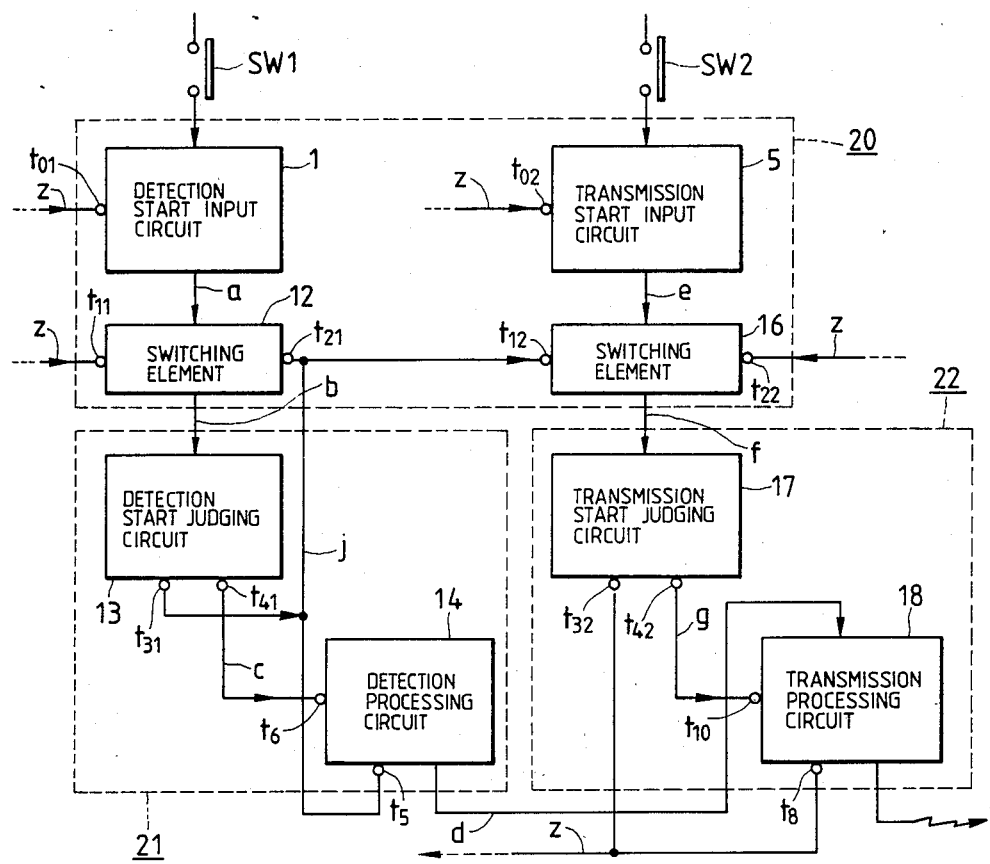
Figure 13:
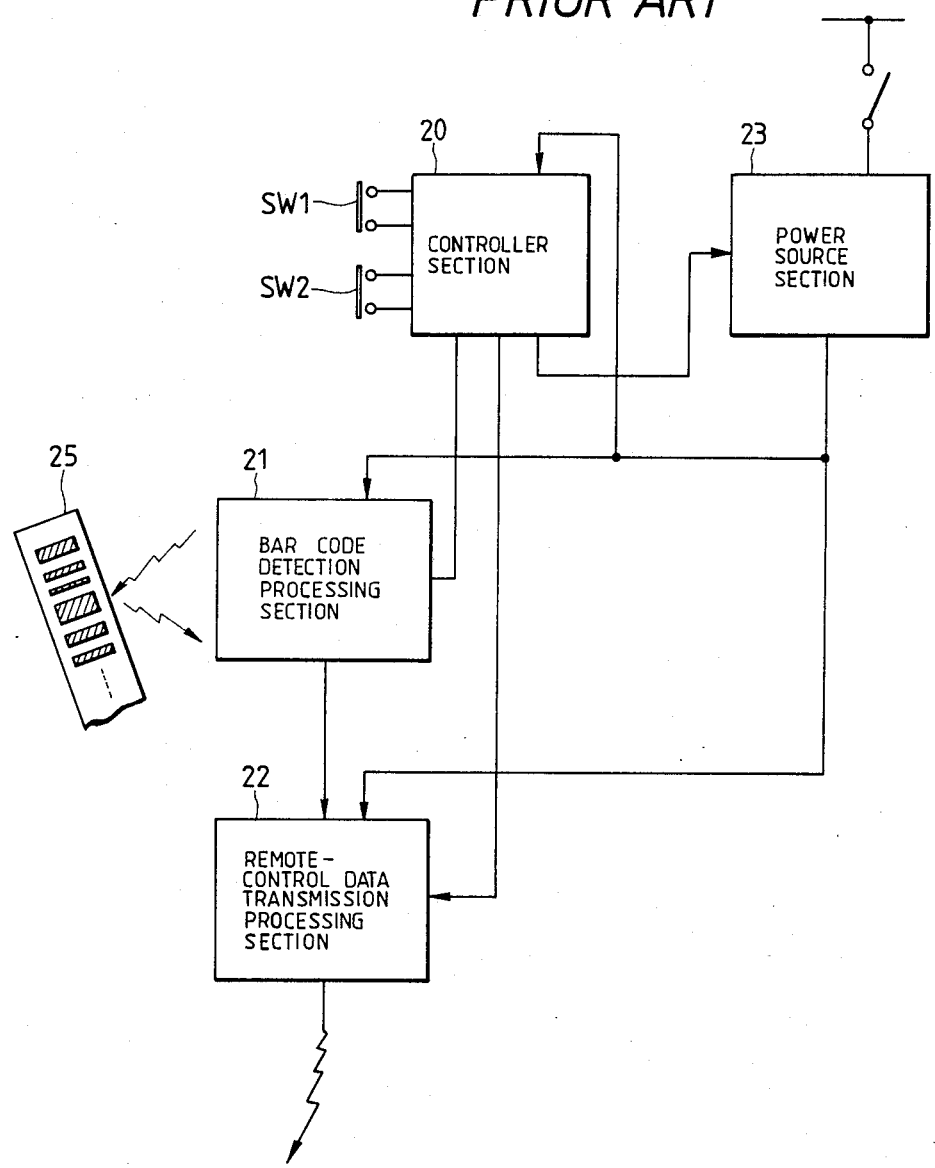
Figure 14:
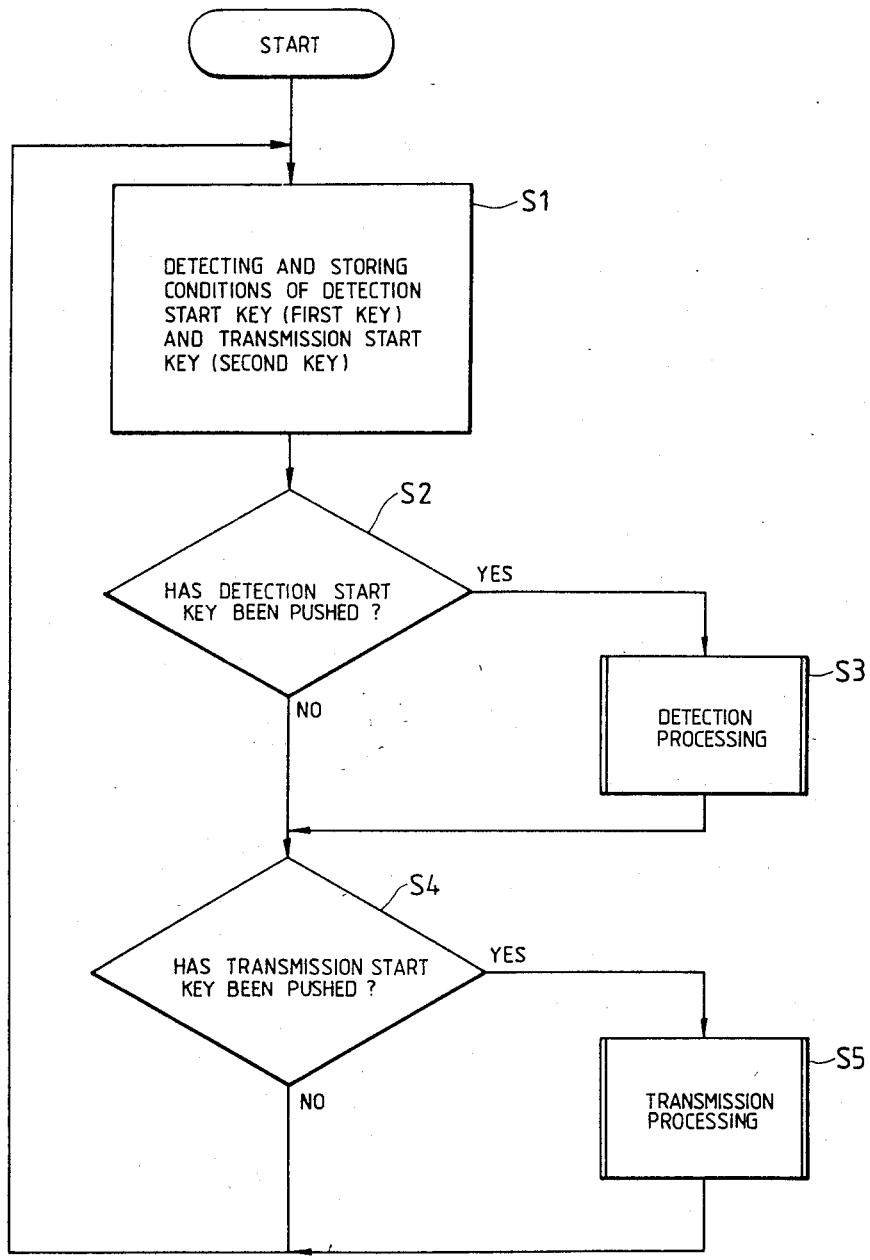

As a major part is shown in FIG. 1, the embodiment, with respect to the prior art bar-code remote control device of FIG. 12, has an arrangement in which a control terminal $t_{11}$ of a switching element 12 and a control terminal $t_{22}$ of a switching element 16 are connected to each other, and a non-active terminal $t_{32}$ of a transmission start judging circuit 17 and a processed signal terminal $t_8$ of a transmission processing circuit 18 are connected to the control terminal $t_{22}$ of the switching element 16 via a signal line j. A non-active terminal $t_{31}$ of a detection start judging circuit 13 and a processed signal terminal $t_5$ of a detection processing circuit 14 are connected to a control terminal $t_{01}$ of a detection start input circuit 1, control terminal $t_{21}$ of the switching element 12, control terminal $t_{02}$ of a transmission start input circuit 5 and control terminal $t_{12}$ of the switching element 16.

When the detection start judging circuit 13 judges that a detection instructing signal is non-active, or when bar code detection processing in the detection processing section 14 is completed, the switching element 12 disconnects signal lines a and b, and the switching element 16 connects signal lines e and f.

When the transmission start judging circuit 17 judges that a transmission instructing signal is non-active, or when transmission of a remote-control data signal from the transmission processing section 18 is completed, the switching element 12 connects signal lines a and b, and the switching element 16 disconnects the signal lines e and f.

The remainder arrangement of FIG. 1 is identical to the prior art bar-code remote-control device of FIG. 12.

In the aforegoing arrangement, the switching element 12 forms a gate circuit.

The arrangement of FIG. 1 operates as follows.

In a condition where transmission of a remote-control data signal has been completed, a reset signal from the processed signal terminal $t_8$ of the transmission processing circuit 18 causes the switching element 12 to connect the signal lines a and b and causes the switching element 16 to disconnect the signal lens e and f.

When a first key SW1 and a second key SW2 are operated from the reset condition, the detection processing circuit 5 stores these operated conditions of the first key SW1 and second key SW2, respectively, in step S1 of the flow chart of FIG. 2.

In step S2 of FIG. 2, it is judged whether the second key (transmission start key) has been pushed or not. However, since the signal lines e and f are disconnected from each other by the switching element 16 at this time, the transmission start judging circuit 17 does not detect the operation against the second key SW2, and in subsequent step S3, it is judged whether the first key (transmission start key) has been pushed or not.

At this time, since the signal lines a and b are connected with each other by the switching element 12, the detection start judging circuit 13 is in receipt of the detection instructing signal. Accordingly, in subsequent step S4 in the flow chart of FIG. 2, the detection processing circuit 14, in receipt of a driving signal from an active terminal $t_{41}$ of the detection start judging circuit 13, reads a bar code, and a data signal is produced and stored.

Subsequently, a reset signal from the processed signal terminal $t_5$ of the detection processing circuit 14 is entered in the control terminal $t_{21}$ of the switching element 12 and the control terminal $t_{12}$ of the switching element 16.

Since the switching element 12 disconnects a and b whereas the switching element 16 connects the signal lines e and f in response to the reset signal, a transmission instructing signal is entered in the transmission start judging circuit 1, and the process goes ahead from step S4 in the flow chart of FIG. 2, through step S1 and step S2 again, to step S5 in which a driving signal from an active terminal $t_{42}$ of the transmission start judging circuit 17 causes the transmission processing circuit 18 to start its operation. By the operation of the transmission processing circuit 18, a data signal is taken from the detection processing circuit 14, a remote-control data signal is produced based on the data signal, and it is transmitted to a host apparatus (not shown) from the transmission processing circuit 18.

According to the invention, also when an operator, although intending to operate the second key SW2 after operating the first key SW1, actually operates these keys SW1 and SW2 simultaneously, the data signal which has been detected and processed in response to the first operation against the first key SW1 is never deleted, and it is taken in the remote-control data transmission processing section 22 for subsequent transmission processing.

More specifically, when bar code detection processing is performed in the detection processing 14 in response to the operation against the first key SW1, the switching element 12 disconnects the signal lines and b and the switching element 16 connects the signal lines e and f, in response to the reset signal from the processed signal terminal $t_5$, as described above.

Therefore, in such an event, step S2 follows step S1, and the transmission start judging circuit 17 detects the transmission instructing signal from the controller section 20. Therefore, step S5 follows immediately, so that the transmission processing circuit 18 takes therein the data signal which has been detected and processed in response to the first operation against the first key SW1 and stored in the detection processing circuit 14, and a remote-control data signal produced based on the data signal is transmitted to the host apparatus.

In this fashion, according to the aforegoing embodiment of the invention, the data signal obtained by reading and processing a bar code upon the first operation of the first key SW1 is never deleted by subsequent erroneous simultaneous operations against the first and second keys SW1 and SW2, and the first detected and processed data signal is transmitted to the host apparatus from the remote-control data transmission processing section 22.

Therefore, since no error caused by operations against the first and second keys SW1 and SW2 occurs, an operator can operate the device easily and speedily, and a further scale reduction in the operational surface portion of the device is expected.

A circuit arrangement of an embodiment having the second inventive technical means is explained below, referring to FIG. 3.

Figure 3:
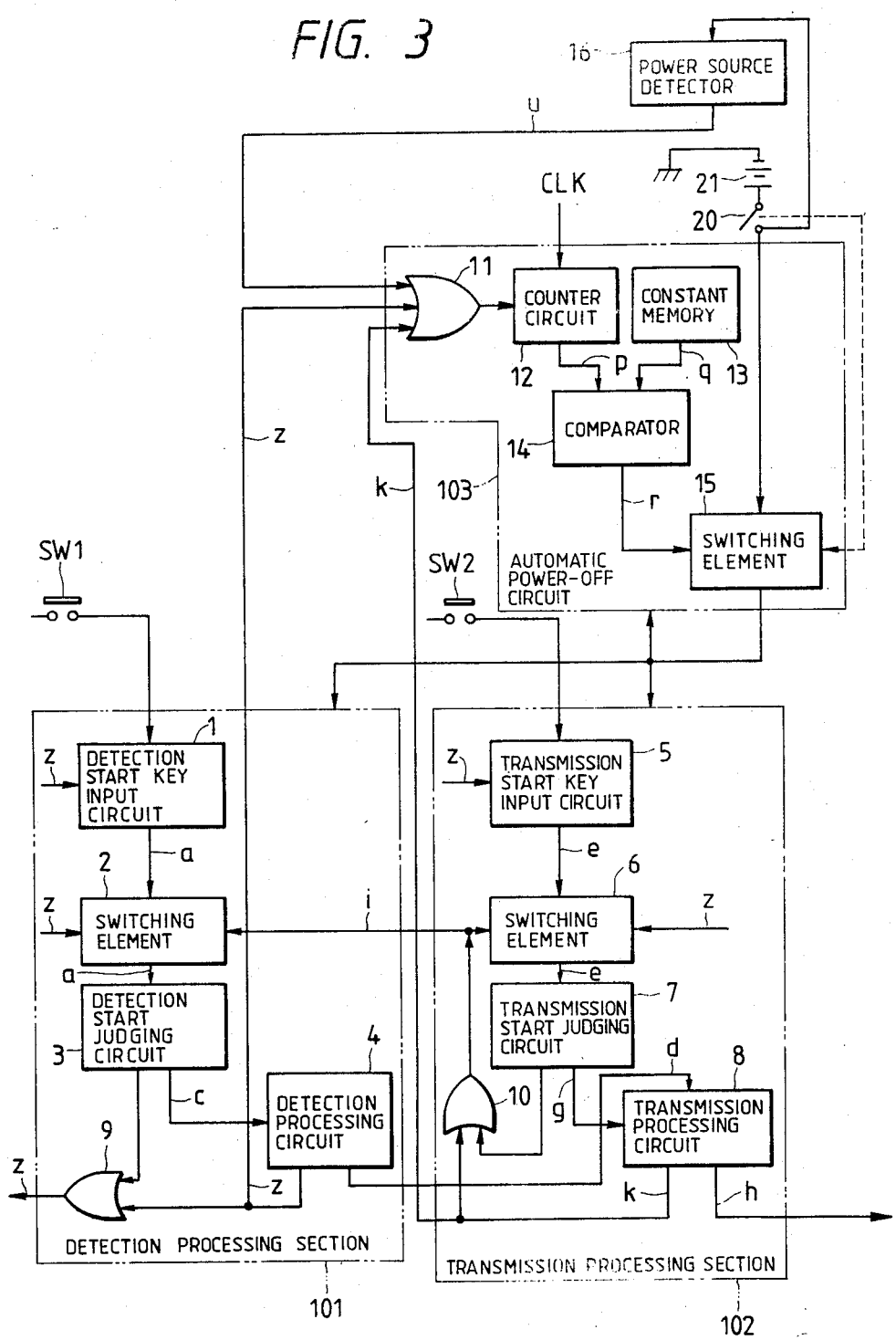
FIG. 3 is a circuit arrangement of an embodiment having a second technical means.

As shown in FIG. 3, the embodiment of the invention, with respect to the above-described prior art bar-code remote-control device, has an arrangement in which the detection processing circuit 4 is connected to an OR circuit 11 in lieu of the detection start key input circuit 1 in the prior art device so that a processing completion signal of the detection processing circuit 4 is entered in the OR circuit 11.

Figure 15:
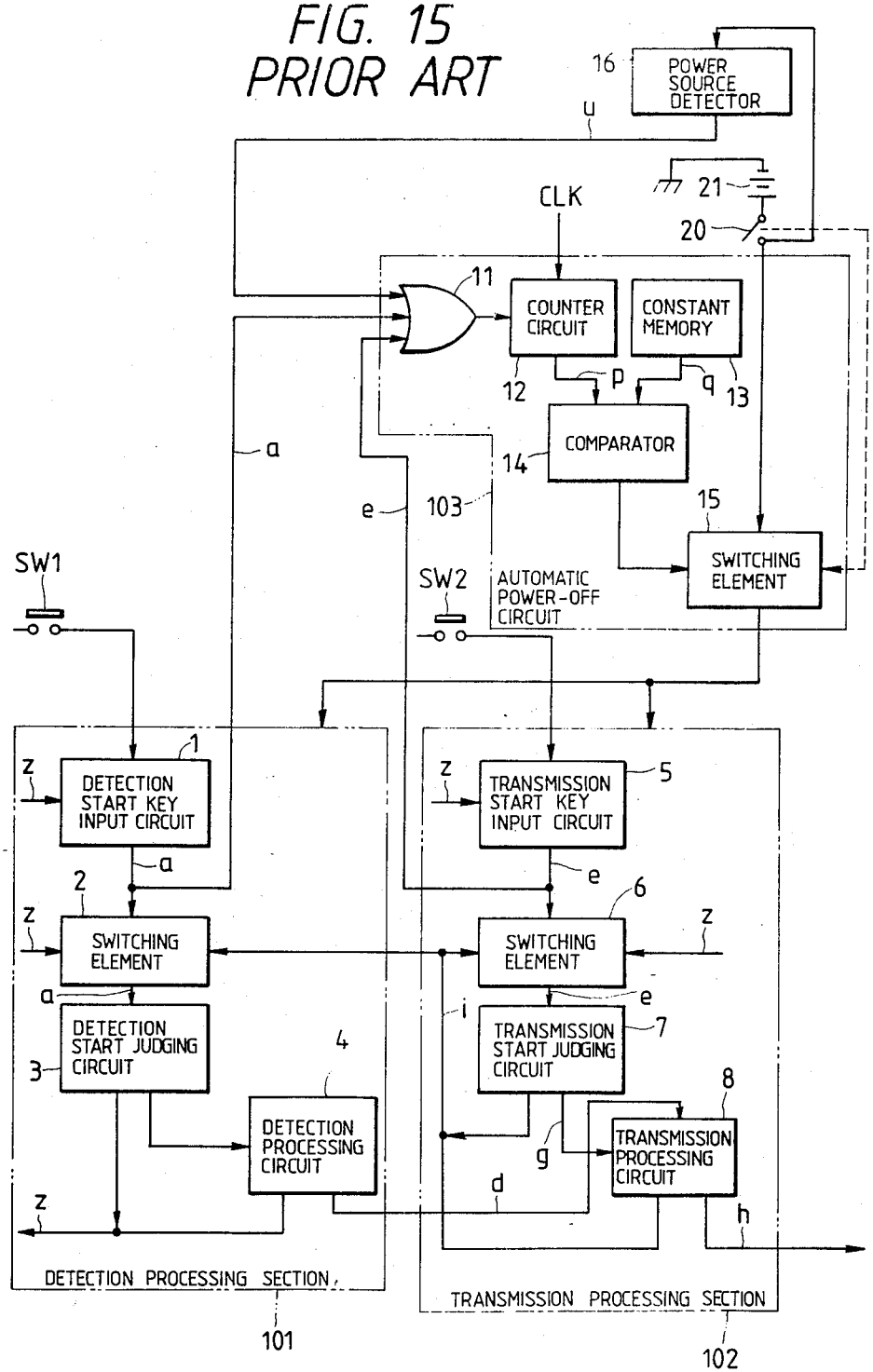

Further, the transmission processing circuit 8 is connected to the OR circuit 11 in lieu of the transmission start key input circuit 5 in the prior art device of FIG. 15 so that a processing completion signal k of the transmission processing circuit 8 is entered in the OR circuit 11.

A non-active terminal of the detection start judging circuit 3 and a processing completion signal terminal of the detection processing circuit 4 are connected to an input terminal of the OR circuit 9 whose output terminal is connected to control terminals of the detection start key input circuit 1, transmission start key input circuit 5 and switching elements 2 and 6.

Similarly, a non-active terminal of the transmission start judging circuit 7 and a processing completion signal terminal of the transmission processing circuit 8 are connected to an input terminal of the OR circuit 10 whose output terminal is connected to the control terminals of the switching elements 2 and 6.

The remainder arrangement of the embodiment is identical to the prior art bar-code remote-control device of FIG. 15, and a detailed explanation is omitted.

In this embodiment, a power source detector 16 forms a first detector means, the detection processing circuit 4 forms a second detector means, and the transmission processing circuit 8 forms a third detector means.

Under this arrangement, the device operates as follows.

In this embodiment, similarly to the above-explained prior art bar-code remote-control device, the switching element 15 is switched upon an ON-action of the power switch 20, and power from the battery 21 is supplied to the detection processing section 101 and transmission processing section 102.

Concurrently, since a detection signal u, i.e., a first reset signal is entered in the OR circuit 11 from the power source detector 16, the counter circuit 12 counts clocks CLK, and the counting continues for a predetermined time, e.g., for 25 seconds until the count value reaches a predetermined count value established in the constant memory 13.

Meanwhile, when the detection start key SW1, first, and the transmission start key SW2, subsequently, are operated, detection processing in the detection processing section 101 and transmission processing in the transmission processing section 102 are performed as already explained about the prior art bar-code remote-control device of FIG. 15.

In these processing processes, when the detection processing in the detection processing 101 is completed, a processing completion signal z is generated from the detection processing circuit 4, and the processing completion signal z, i.e., a second reset signal, is entered in the OR circuit 11. Therefore, the counter circuit 12 is reset and resumes a new counting of clocks CLK.

The counting of the counter circuit 12 is continued for, e.g., 25 seconds until the count value p reaches the predetermined count value q established in the constant memory 13. However, since transmission processing in the transmission processing section 102 is completed during the counting, a processing completion signal k as a third reset signal is entered in the OR circuit 11 from the transmission processing circuit 8.

Therefore, the counter circuit 12 is reset again, and starts a new counting of clocks CLK. The count value p of the counter circuit 12 reaches the predetermined count value q a predetermined time later, e.g., 25 seconds later than the third reset signal is entered, and an interruption signal r is entered in the switching element 15 from the comparator 14 so that the switching element 15 interrupts voltage supply from the battery 21 to the detection processing section 101 and transmission processing section 102.

In this fashion, the counting of the counter circuit 12 is renewed upon completion of detection processing in the detection processing section 101 or completion of transmission processing in the transmission processing section 102, and power interruption is suspended for a predetermined time after the start of a new counting.

Additionally, since renewal of the counting of the counter circuit 12 is effected from time to time by interrupts, an operator can effect reliably detection and transmission processing operations in a self-composed manner without operating the power switch 20 repeatedly. Therefore, the operator can perform many times of detection processing and transmission processing smoothly and efficiently.

A circuit arrangement of an embodiment having the third inventive technical means is explained below, referring to FIG. 4.

Figure 4:
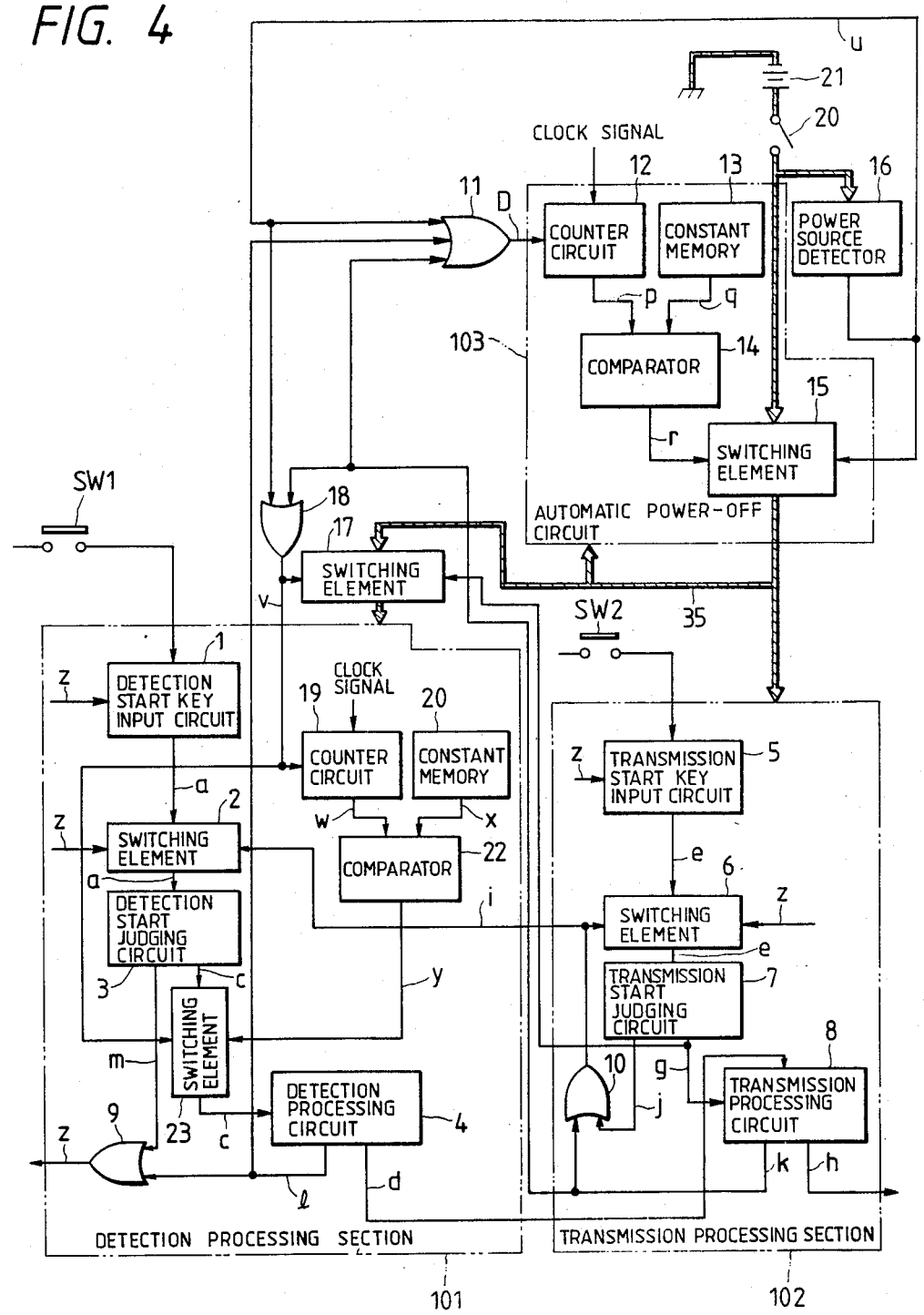
FIG. 4 is a circuit arrangement of an embodiment having a third technical means.
Figure 16:
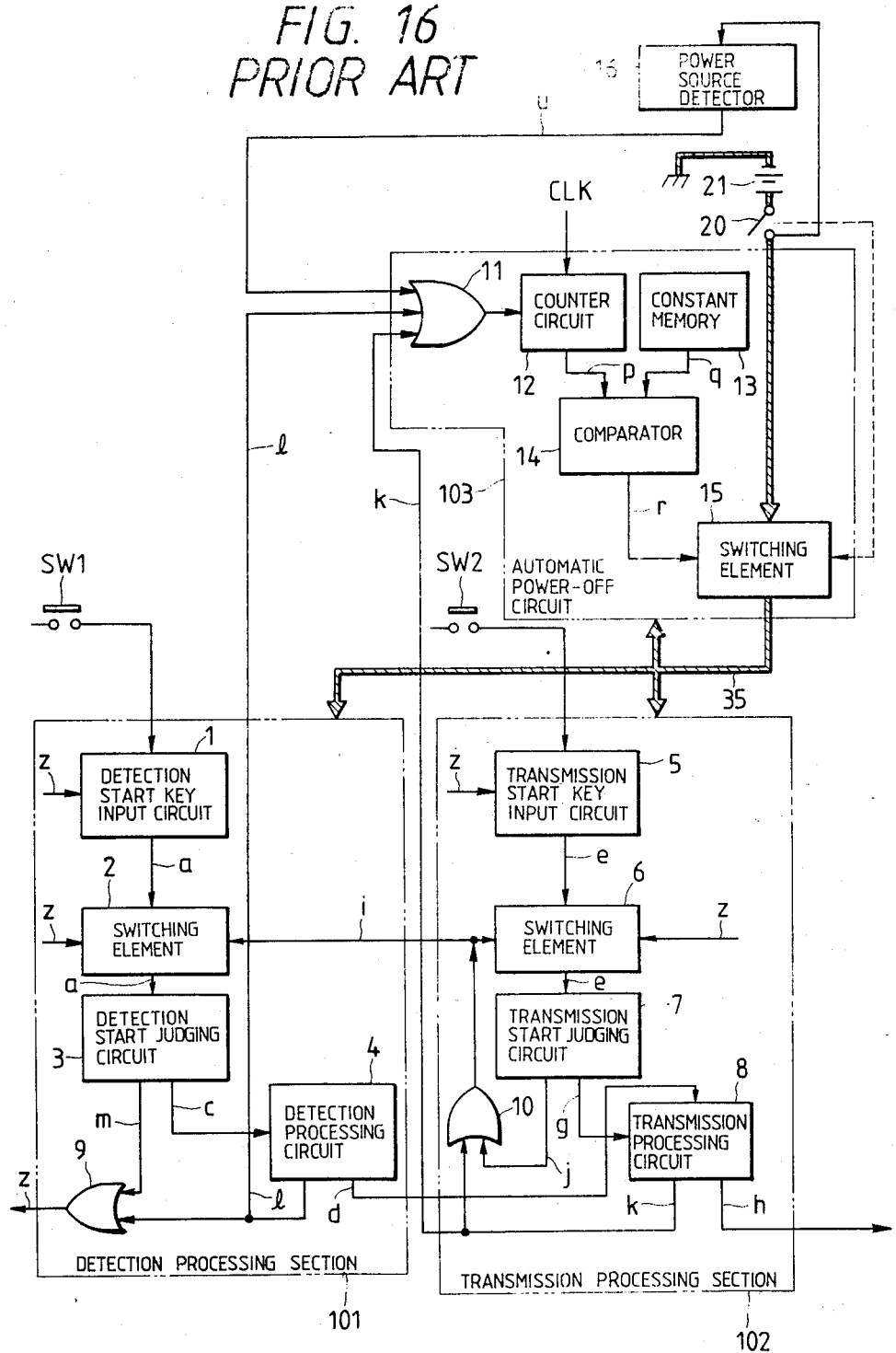

As shown in FIG. 4, with respect to the prior art bar-code remote-control device of FIG. 16, the embodiment has an arrangement in which a power line 35 is connected to the detection processing section 101 via a switching element 17 which is supplied with a driving signal g from the transmission start judging circuit 7.

There is provided an OR circuit 18 which is supplied with a first reset signal u and a third reset signal k. The output terminal of the OR circuit 18 is connected to a counter circuit 19 and a switching element 23 both provided in the detection processing section 101. The detection processing section 101 further includes a constant memory 20 and a comparator 22, and output terminals of the counter circuit 19 and constant memory 20 are connected to the input terminals of the comparator 22 whose output is connected to the switching element 23.

The switching element 23 is supplied with a driving signal c from the detection start judging circuit 3 and connected to the output terminal of the OR circuit 18. The output terminal of the switching element 23 is connected to the input terminal of the detection processing circuit 4.

The remainder arrangement of FIG. 4 is identical to the prior art bar-code remote-control device of FIG. 16.

In FIG. 4, the power source detector 16 forms a first detector means, the detection processing circuit 4 forms a second detector means, and the transmission processing circuit 8 forms a third detector means. Further, the OR circuit 18, switching element 17, counter circuit 19, constant memory 20 comparator 22 and switching element 23 form a power source control means.

The arrangement of FIG. 4 operates as explained below.

When the power switch 20 is turned on, a first reset signal u is generated from the power source detector 16 and entered in the OR circuit 11, OR circuit 18 and switching element 15. In receipt of the first reset signal u, the switching element 15 is turned on, and the OR circuit 11 generates a driving signal D which causes the automatic power-off circuit 103 to start the counting of a predetermined count value described before.

The first reset signal u passes through the OR circuit 18 and becomes a driving signal v which turns on the switching element 17 to start power supply to the detection processing section 101. At the same time, the driving signal v turns off the switching element 23 (inactivate the detection processing circuit 4) and makes the counter circuit 19 operative.

In this fashion, the counter circuit 19 starts the counting of clock signals, and a predetermined time later than the count value w has reached a predetermined count value x stored in the constant memory 20, a driving signal y is generated from the comparator 22. Since the driving signal y is entered in the switching element 23, the switching element 23 is turned on. The predetermined time in this case is set to a time long enough to warm up the detection processing circuit 4 after power supply from the battery 21 to the detection processing section 101.

Therefore, even when the detection start judging circuit 3 judges that the operation signal a is normal, bar code detection processing is started a predetermined time later, i.e., when the detection processing circuit 4 is warmed up sufficiently. Therefore, the detection processing circuit 4 operates reliably, and a bar code detection error never occurs.

When the transmission start judging circuit 7 judges that the operation signal e is normal, the transmission processing circuit 8 becomes operative in receipt of a driving signal from the transmission start judging circuit 7, and takes therein the data signal d from the detection processing circuit 4. Subsequently, the switching element 17 is turned off by the driving signal g, and power supply from the battery 21 to the detection processing section 101 is interrupted. The transmission processing circuit 8 encodes the data signal d and produces a remote-control data signal h. The remote-control data signal h is transmitted to a host apparatus, and the transmission processing circuit 8 produces a third reset signal k upon completion of the processing.

Since the third reset signal k is entered in the switching element 17 via the OR circuit 18, power supply from the battery 21 to the detection processing section 101 heretofore interrupted during the processing in the transmission processing circuit 8 is restored. Therefore, bar code detection which is performed continuously in the detection processing section 101 is effected smoothly.

As described, according to the embodiment, since power supply from the battery 21 to the detection processing section 101 is interrupted during the processing in the transmission processing circuit 8, a somewhat consumed battery also ensure a reliable transmission, and it is possible to elongate the transmission distance of the bar-code remote-control device by supplying much current through a transmitting LED, using the corresponding power. Alternatively, in lieu of elongating the transmission distance, the life of the battery 21 may be elongated.

Embodiments having the fourth inventive technical means are explained below, referring to FIGS. 5 and 6.

Figure 5:
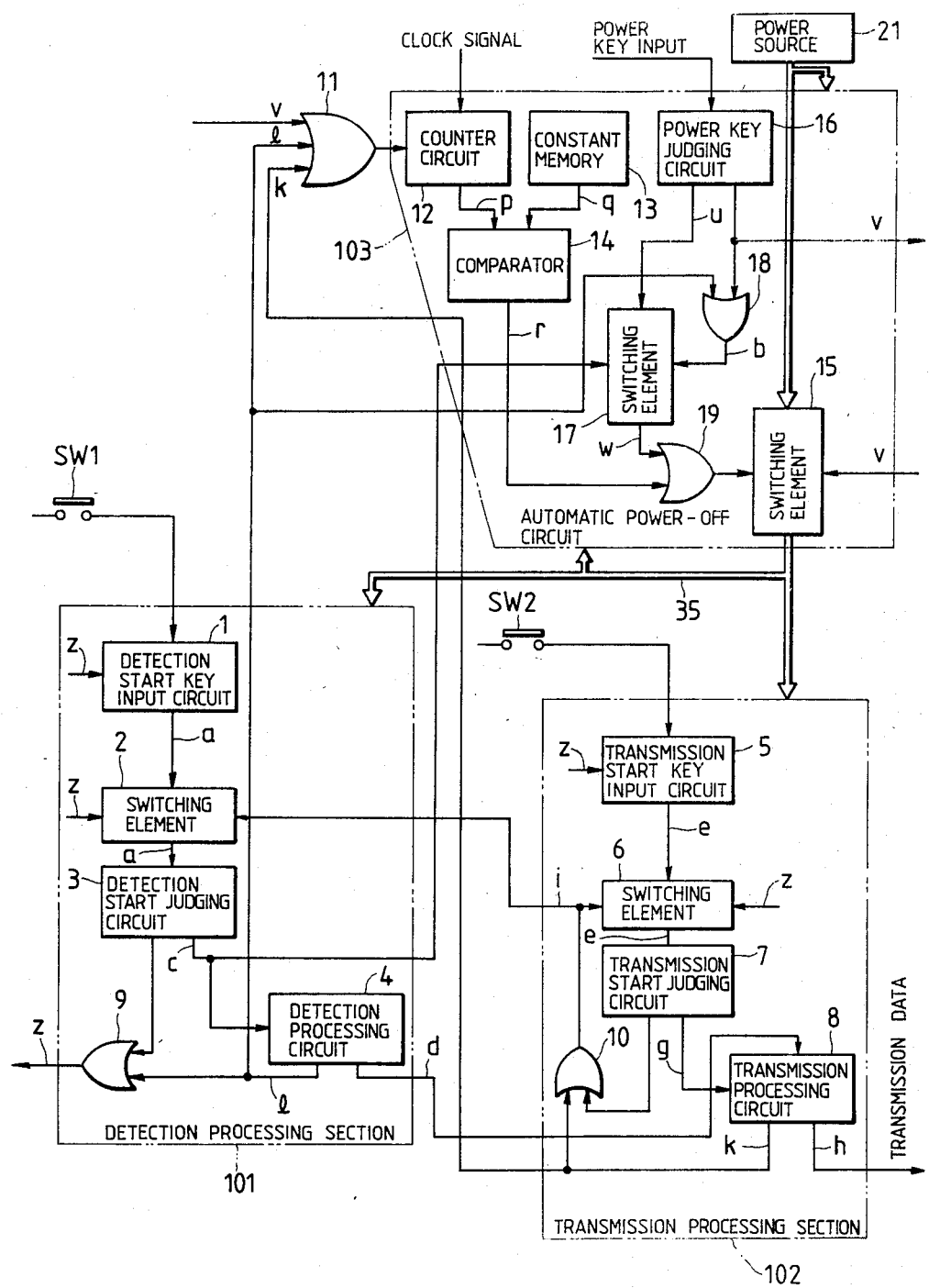
Figure 6:
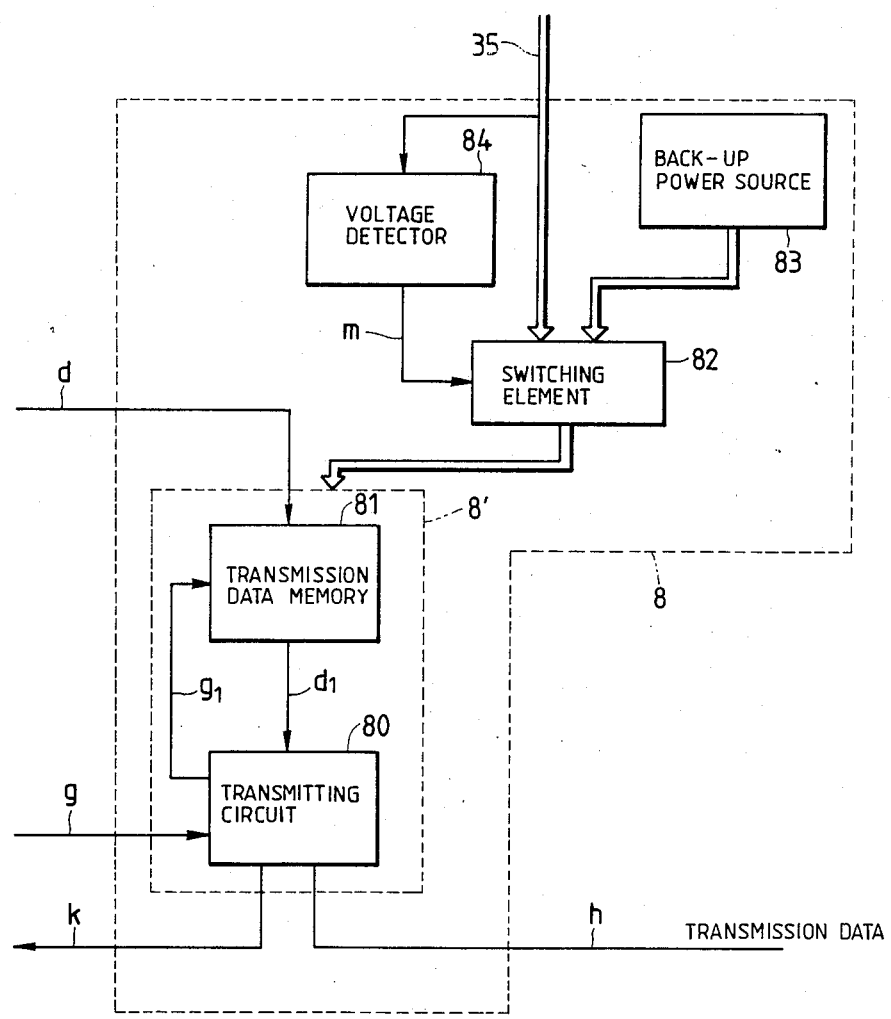

FIG. 5 shows a circuit arrangement of an embodiment, and FIG. 6 is a fragmentary circuit arrangement of an alternative embodiment of the embodiment of FIG. 5.

In FIG. 5, reference numeral 101 refers to a detection processing section, 102 to a transmission processing section, 103 to an automatic power-off circuit, 3 to a detection start judging circuit, 4 to a detection processing circuit, 7 to a transmission start judging circuit, 8 to a transmission processing circuit, 11 to an OR circuit, 12 to a counter circuit, 13 to a constant memory, 14 to a comparator, 15 to a switching element, 16 to a power key judging circuit, 17 to a switching element, 18 and 19 to OR circuits, and 21 to a power source.

Figure 17:
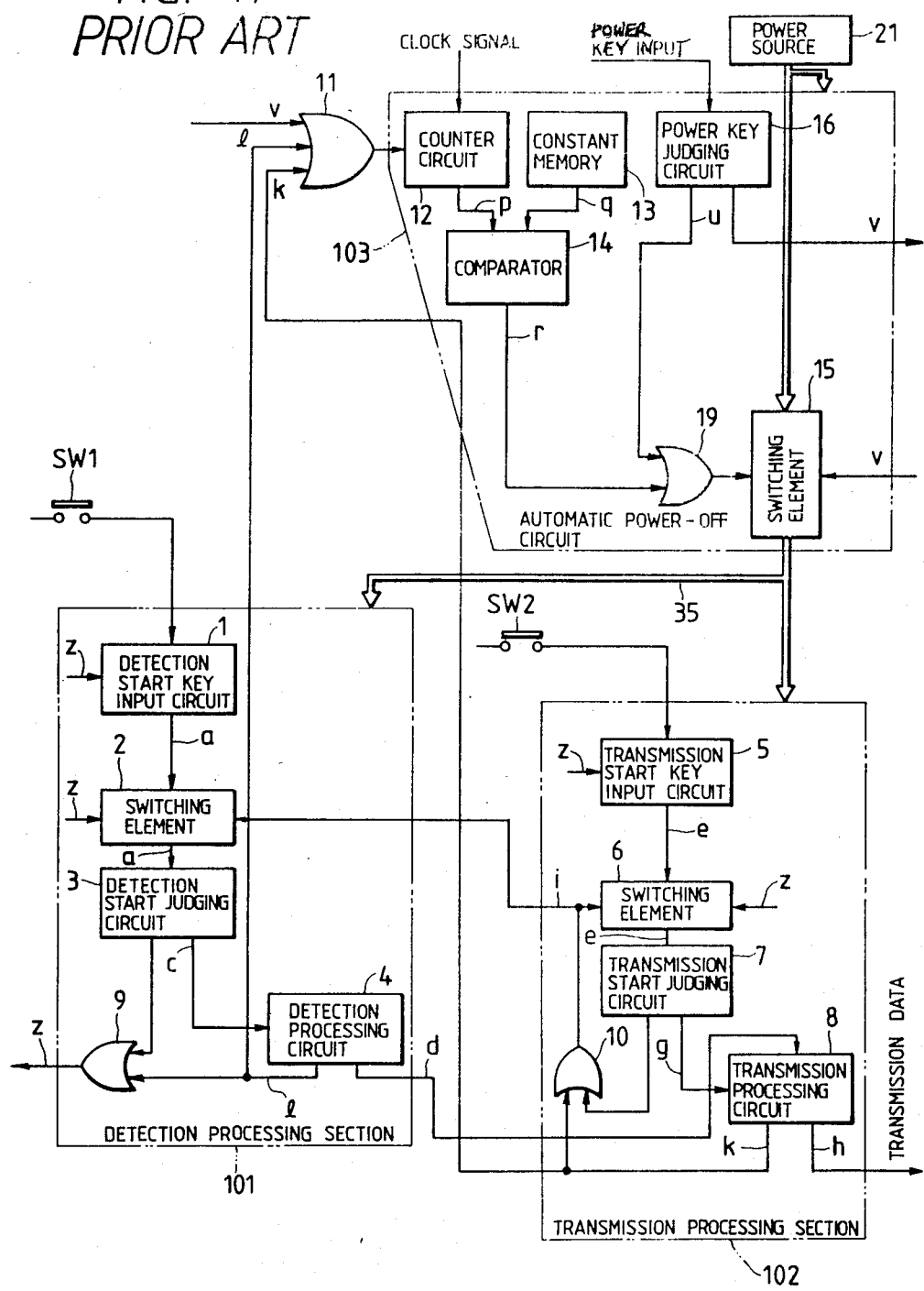

As shown in FIG. 5, the embodiment of the invention includes the OR circuit 18 and the switching element 17 in addition to the prior art bar-code remote-control device of FIG. 17. The OR circuit 18 is supplied with a first reset signal v and a second reset signal 1 from the detection processing circuit 4, and an output terminal of the OR circuit 18 is connected to the switching element 17 so that the switching element 17 is turned on by an output signal b of the OR circuit 18.

The detection start judging circuit 3 is connected to the switching element 17 so that the switching element 17 is turned off by a driving signal c from the detection start judging circuit 3. The embodiment further includes a back-up power supply means in the transmission processing circuit 8.

FIG. 6 is a block diagram showing an arrangement of the transmission processing circuit including the back-up power supply means. A power line 35 and an output terminal of the back-up power source 83 are connected to a switching element 82, and a voltage detector 84 is connected to the power line 35. The voltage detector 84 is configured to enter a detection signal m in the switching element 82 in presence of a given voltage in the power line 35 so that power is supplied to the transmission processing circuit 8' from the power line 35 by the detection signal m, and so that when the detection signal m is not entered in the switching element 82, the transmission processing circuit 8' is supplied with power from the back-up power source 83.

The transmission processing circuit 8' consists of a transmission data memory 81 and a transmission circuit 80. The transmission data memory 81 is supplied with a data signal d from the detection processing circuit 4.

The transmission data memory 81 stores the data signal d, and outputs a data signal dl to the transmission circuit 80 every time when a detection signal gl is entered from the transmission circuit 80, and when it outputs all the data signal d, a data ending code is outputted from the transmission data memory 81 to the transmission circuit 80.

In response to the driving signal from the transmission start judging circuit 7, the transmission circuit 80 produces the detection signal gl, produces a remote-control data signal h by encoding an obtained data signal dl into a predetermined data form, and transmits the remote-control data signal h to a host apparatus.

The remainder arrangement of the embodiment is identical to the prior art bar-code remote-control device of FIG. 17, and its explanation is omitted.

In the embodiment shown in FIG. 5, the processing key judging circuit 16 forms a first detector means, the detection processing circuit 4 forms a second detector means, and the transmission processing circuit 8 forms a third detector means. Further, the switching element 17 forms a preventing means for preventing interruption of power supply, and the back-up power source 83, switching element 82 and voltage detector 84 in FIG. 6 form a back-up power supply means of the transmission processing circuit 8.

These embodiments operate as explained below.

When the detection start judging circuit 3 judges that the operation signal a is normal, a driving signal c from the detection start judging circuit 3 activates the detection processing circuit 4 to start bar code detection. Simultaneously, the driving signal c is entered in the switching element 17 and turns it off.

Therefore, also when an OFF signal u is outputted from the power source key judging circuit 16 upon a cut-off accident of the power source key during bar code detection processing in the detection processing circuit 4 in the detection processing section 101, the output signal w from the switching element 17 does not enter in the OR circuit 19 because the switching element 17 is held off. Therefore, the switching element 15 is not turned off, and power supply from the power source 21 to the detection processing section 101 and transmission processing section 102 is never interrupted.

In this fashion, in the event that the power key is cut off, the bar code detection of the detection processing circuit 4 is proceeded without being interrupted, and upon completion of the bar code detection, a second reset signal 1 from the detection processing circuit 4 is entered in the OR circuit 18 which responsively produces an output signal b to turn on the switching element 17. Therefore, the switching element 15 is turned off by an output signal of the OR circuit 19, and power supply from the power source 21 is interrupted.

When power supply from the power source 21 is interrupted, which results in no output of the detection signal m from the voltage detector 84 of FIG. 6, the switching element 82 switches from power supply from the power source 21 to power supply from the back-up power source 83. The transmission processing circuit 8' is activated by the back-up power source 83, and the data signal d stored in the transmission data memory 81 is read out by the transmission circuit 80 which responsively produces a remote-control data signal h based on the data signal d and transmits the signal h to the host apparatus.

Regarding bar code detection by the detection processing circuit 4, when the detection processing circuit 4 does not detect any detection input from the bar code for a predetermined time, it is judged that bar code detection is completed, and a second reset signal 1 is outputted responsively from the detection processing circuit 4. Therefore, a plurality of independent bar codes can be read continuously or successively by the detection processing circuit 4. In this case, the second reset signal 1 is outputted from the detection processing 4 after detection of all bar codes is completed.

A reset signal z produced by the OR circuit 9 based on the second reset signal resets the detection processing section 101 and transmission processing section 102 into their initial conditions.

Also when the detection start judging circuit 3 judges that the signal a from the detection start key input circuit 1 is not normal, the reset signal z is outputted from the OR circuit 9 to establish the aforementioned initial conditions.

In this fashion, according to the embodiment, even if the power key is cut off during bar code detection, power supply from the power source 21 is not interrupted so as to continue the bar code detection, and upon completion of the detection, the second reset signal 1 produced from the detection processing circuit 4 interrupts power supply from the power source 21. However, when the power supply from the power source 21 is interrupted, the voltage detector 84 detects it and activates the switching element 82 to supply power to the transmission processing circuit 8' from the back-up power source 83 so that the transmission processing circuit 8' never fails to produce a remote-control data signal and transmit it to the host apparatus.

An embodiment having the fifth inventive technical means is described below, referring to FIGS. 7 and 8(1) through 8(4).

Figure 7:
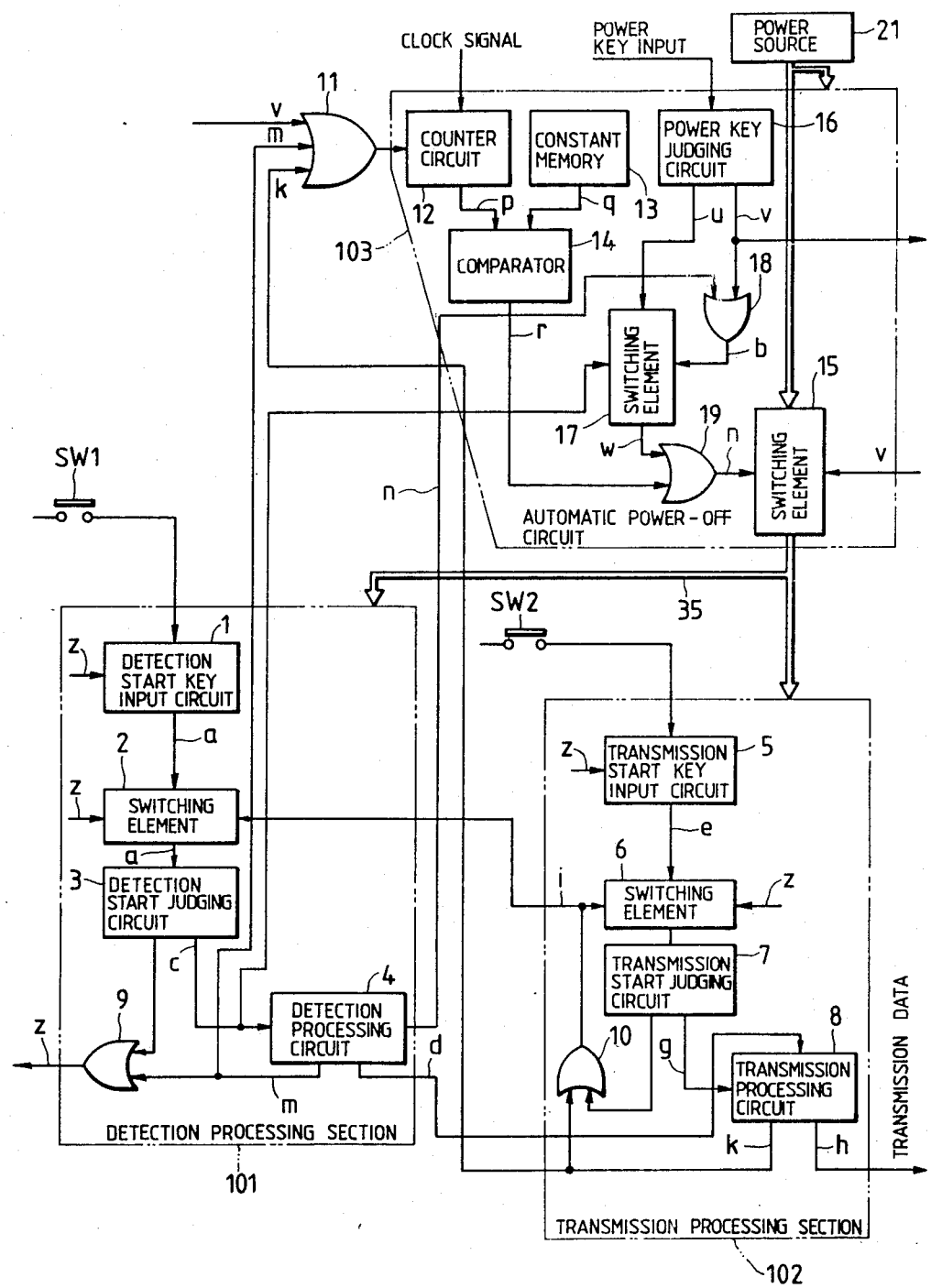

FIG. 7 shows a circuit arrangement of an embodiment, and FIG. 8(1) through 8(4) are timing charts showing the operation of the device of FIG. 7.

In FIG. 7, reference numeral 101 refers to a detection processing section, 102 to a transmission processing section, 103 to an automatic power-off circuit, 21 to a power source, 16 to a power key judging circuit, 4 to a detection processing circuit, 8 to a transmission processing circuit, and 17 to a switching element.

Figure 18:
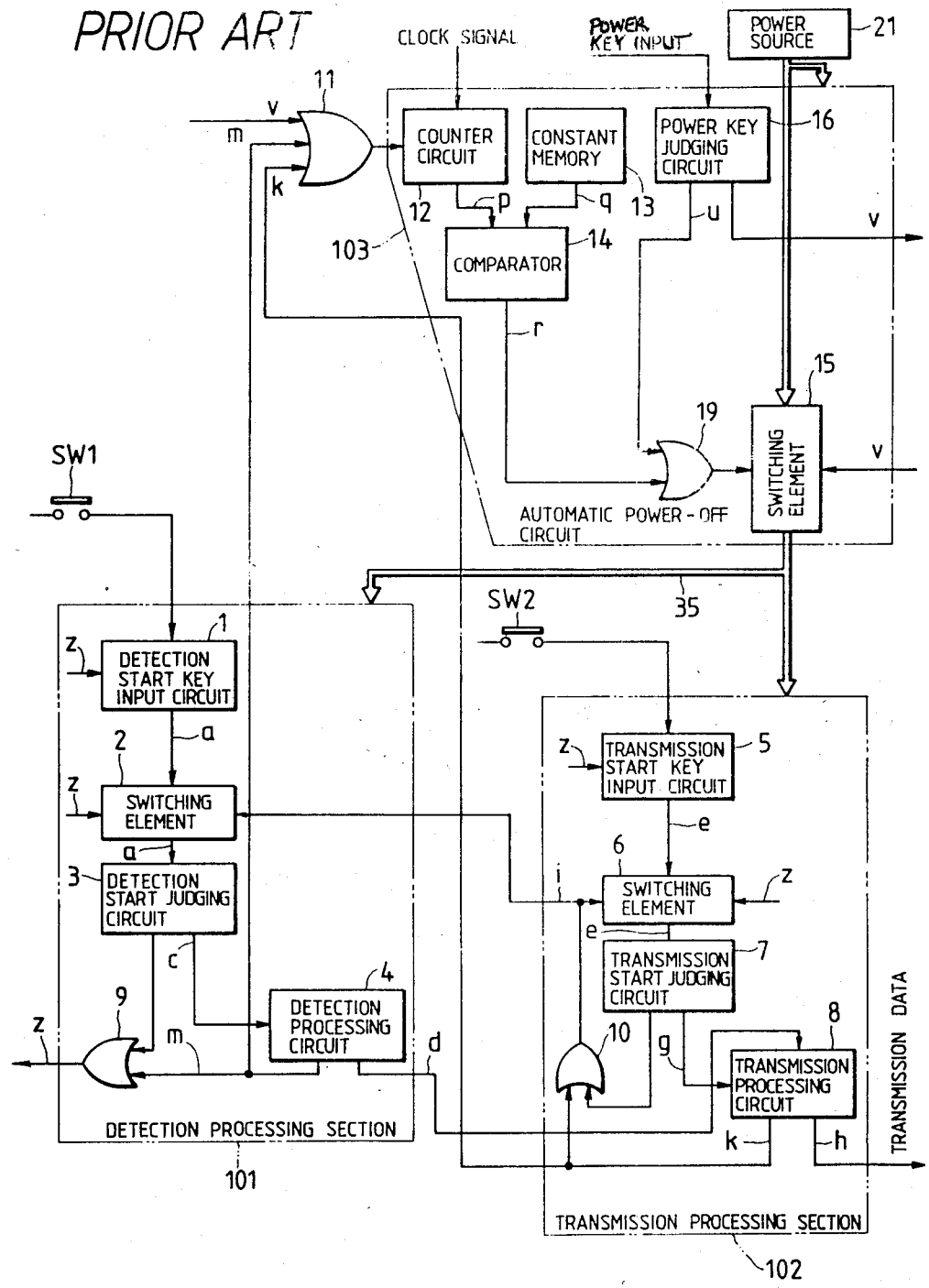

As shown in FIG. 7, the embodiment of the invention includes the OR circuit 18 and the switching element 17 in the automatic power-off circuit 103 in addition to the prior art bar-code remote-control device of FIG. 18. The OR circuit 18 is supplied with a first reset signal v and a detection error signal n from the detection processing circuit 4, and an output terminal of the OR circuit 18 is connected to the switching element 17 so that the switching element 17 is turned on by an output signal b of the OR circuit 18.

The remainder arrangement of the embodiment is identical to the prior art bar-code remote-control device of FIG. 18, and its explanation is omitted.

In FIG. 7, the power key judging circuit 16 forms a first detector means, the detection processing circuit 4 for as a second detector means, and the transmission processing circuit 8 forms a third detector means. Further, the switching element 17 forms a preventing means.

The aforegoing arrangement operates as described below.

When the detection start judging circuit 3 judges the operation signal a is normal, the detection processing circuit 4 is activated by the driving signal c from the detection start judging circuit 3 to start bar code detection processing. Concurrently, the driving signal c is entered in the switching element 17 and turns it off.

Therefore, also when an OFF signal u is outputted from the power source key judging circuit 16 upon a cut-off accident of the power source key during bar code detection processing in the detection processing circuit 4 in the detection processing section 101, the output signal w from the switching element 17 does not enter in the OR circuit 19 because the switching element 17 is held off. Therefore, the switching element 15 is not turned off, and power supply from the power source 21 to the detection processing section 101 and transmission processing section 102 is never interrupted.

In this fashion, in the event that the power key is cut off, the bar code detection of the detection processing circuit 4 is proceeded without being interrupted, and upon completion of the bar code detection, a second reset signal m from the detection processing circuit 4 is entered in the OR circuit 11, so that power supply from the power source 21 for a predetermined time from the input time is established.

Regarding bar code detection by the detection processing circuit 4 in this case, when the detection processing circuit 4 does not detect any detection input from the bar code for a predetermined time, it is judged that bar code detection is completed, and a second reset signal m is outputted responsively from the detection processing circuit 4. Therefore, a plurality of independent bar codes can be read continuously or successively by the detection processing circuit 4. In this case, the second reset signal m is entered in the OR circuit 11 from the detection processing circuit 4 after detection of all bar codes is completed, and power supply from the power source 21 for a predetermined time from this input time is established.

When the detection processing circuit 4 makes an error during bar code detection, an error signal n is entered in the OR circuit 18 from the detection processing circuit 4, and the switching element 17 is turned on by an output signal b of the OR circuit 18. Therefore, when the power key is in a cut-off condition, an output signal w of the switching element 17 is applied to the switching element 15 via the OR circuit 19, and the switching element 15 is turned off to interrupt power supply from the power source 21 immediately.

FIGS. 8(1) through (4) are timing charts for explaining the above-described operations. As shown in FIG. 8(1), the prior art bar-code remote-control device starts power supply from the power source at time $t_2$, a short time later than the power source throw-in at time $t_1$; however, when the power key is cut off at time $t_3$ during bar code detection processing, power supply from the power source is interrupted a short time later, at time $t_4$. In this case, when the power key is not cut off during bar code detection processing, the automatic power-off circuit is activated at time $t_5$ as shown in FIG. 8(2), and power supply from the power source is interrupted time T later than the power key throw-in.

In contrast, in bar code detection and transmission by the inventive bar-code remote-control device shown in FIG. 8(3), even if the power key is cut off at time $t_7$ after bar code detection is started at time $t_6$, power supply from the power source is not interrupted. When the bar code detection is completed at time $t_8$ and a detection error is acknowledged, power supply from the power source is interrupted a short time later at time $t_9$ without delay.

However, as far as a detection error does not occur, power supply is not interrupted, and when the transmission start key is turned on at time $t_{10}$, the transmission processing circuit 8 produces a remote-control data signal. Transmission of the remote-control data signal to a host apparatus is started at time $t_{11}$, and it is completed at time $t_{12}$. Subsequently, power supply from the power source is interrupted at time $t_{13}$ by the second reset signal supplied from the detection processing circuit 4 at time $t_{13}$.

Further, when reading independent multiple bar codes continuously or successively by the inventive bar-code remote-control device, as shown in FIG. 8(4), bar code detection which is started at time $t_6$ is continued without being interrupted also when the power key is cut off at time $t_7$, and the bar code detection is completed at time $t_8$. In this case, if a detection error is acknowledged, power supply from the power source is interrupted a short time later at time $t_9$ without delay.

However, as far as such a detection error does not occur, detection of another bar code can be started continuously at time $t_{13}$. The bar code detection is completed at time $t_{14}$, and when a detection error occurs, power supply from the power source is interrupted at time $t_{15}$.

When the bar code detection in the detection processing circuit 4 is completed at time $t_{14}$, power supply for a predetermined time T from entrance of a second reset signal m in the OR circuit 11 is established by the second reset signal m supplied from the detection processing circuit 4, so that power supply from the power source is interrupted at time $t_{16}$. Meanwhile, the transmission start key SW2 may be operated to have the transmission processing circuit 8 perform its transmission processing, or alternatively, the detection start key SW1 may be operated to have the detection processing circuit 4 perform detection of a new bar code.

In this fashion, according to the embodiment, even if the power key is cut off during bar code detection, power supply from the power source 21 is not interrupted so as to continue the bar code detection. Therefore, reliable and stable bar code detection is ensured.

A circuit arrangement of an embodiment having the sixth inventive technical means is described below, referring t FIG. 9.

Figure 9:
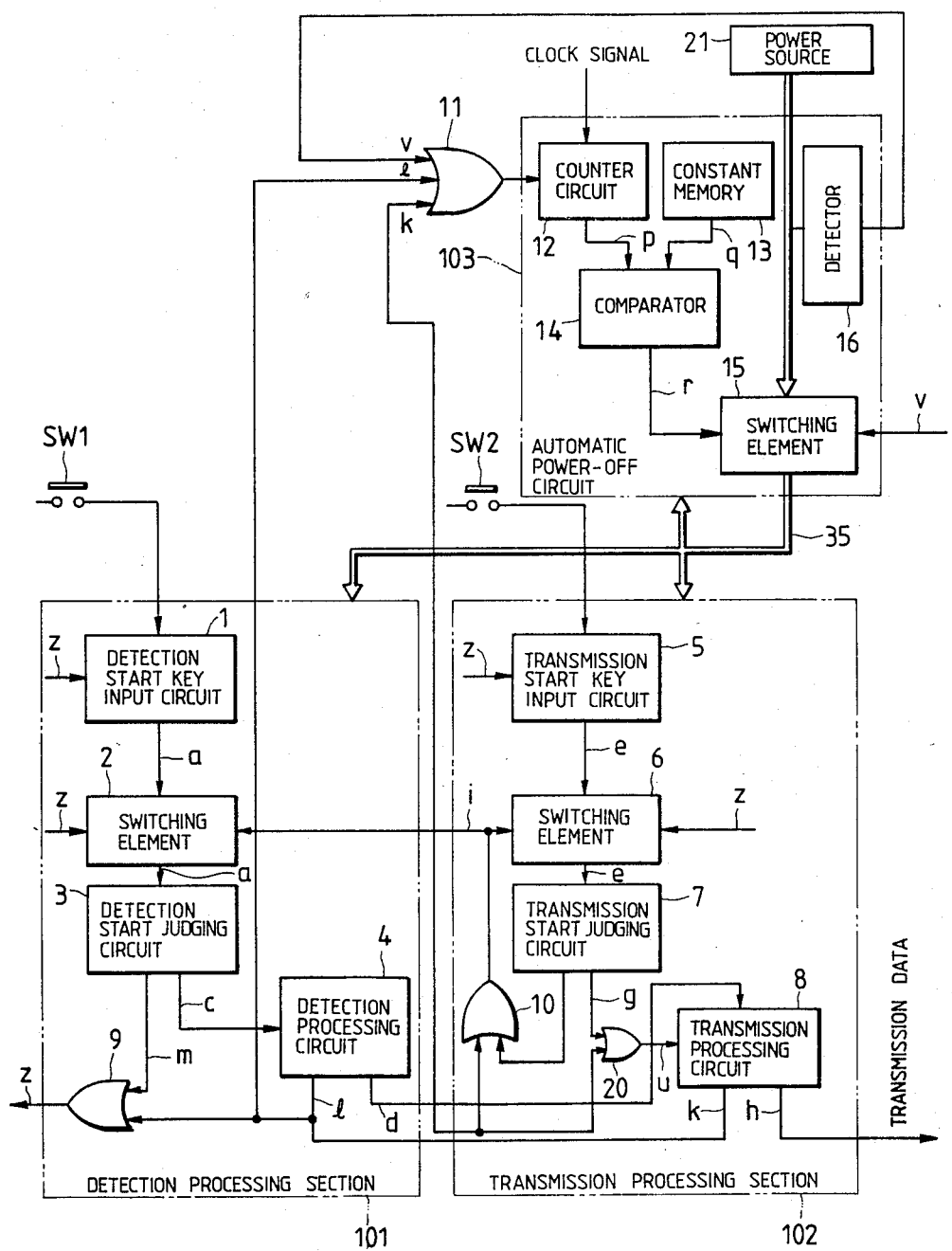
FIG. 9 is a circuit arrangement of an embodiment having a sixth technical means.

In FIG. 9, reference numeral 101 refers to a detection processing section, 102 to a transmission processing section, 103 to an automatic power-off circuit, 21 to a power source, 16 to a detector, 4 to a detection processing circuit, 8 to a transmission processing circuit, and 20 to an OR circuit.

As shown in FIG. 9, the embodiment of the invention includes the OR circuit 20 in the transmission processing section 102 in addition to the prior art bar-code remote-control device of FIG. 19. The OR circuit 20 is supplied with a driving signal g from the transmission start judging circuit 7 and a second reset signal l from the detection processing circuit 4. The transmission processing circuit 8 is driven by an output signal u (transmission instructing signal) from the OR circuit 20 to produce a remote-control data signal and transmit it to a host apparatus.

The remainder arrangement of the embodiment is identical to the prior art bar-code remote-control device of FIG. 19, and its explanation is omitted.

In FIG. 9, the detector 16 forms a first detector means, the detection processing circuit 4 forms a second detector means, the transmission processing circuit 8 forms a third detector means, and the OR circuit for producing a transmission instructing signal forms a major part of an automatic transmitting means.

The aforegoing arrangement operates as follows.

When the detection start key SW1 is operated, an operation signal a is entered in the detection start judging circuit 3 from the detection start key input circuit 1 via the switching element 2. When the detection start judging circuit 3 judges that the operation signal a is normal, the detection processing circuit 4 is activated by a driving signal c form the detection start judging circuit 3 to start bar code detection processing.

The detection processing circuit 4 which has read a bar code produces a data signal d which is subsequently entered in the transmission processing circuit 8 and stored therein. Upon completion of the bar code detection, the detection processing circuit 4 supplies a second reset signal 1 to the OR circuit 11, and power supply from the power source 21 for a predetermined time from entrance of the second reset signal 1 is established as described before.

Further, the second reset signal 1 is entered in the OR circuit 20, and the transmission processing circuit 8 is driven by an output signal u from the OR circuit 20. The transmission processing circuit 8, when acknowledging that the data signal is normal, produces a remote-control data signal h based on the data signal, and transmits it to a host apparatus.

Regarding bar code detection by the detection processing circuit 4, when the detection processing circuit 4 does not detect any detection input from the bar code for a predetermined time, it is judged that bar code detection is completed, and a second reset signal 1 is outputted responsively from the detection processing circuit 4. Therefore, a plurality of independent bar codes can be read continuously or successively by the detection processing circuit 4 In this case, the second reset signal 1 is outputted from the detection processing circuit 4 after detection of all bar codes is completed, and the transmission processing circuit 8 automatically starts its transmitting motion just when the second reset signal 1 is outputted.

The embodiment of FIG. 9 is configured so that transmission mode is also established by operating the transmission start key SW2.

In this fashion, according to the invention, the transmission processing circuit 8 is driven automatically upon completion of bar code detection, and when the data signal is normal, generation of a remote-control data signal and transmission thereof to the host apparatus are effected in a successive manner. Therefore, an operator can perform efficient detection and transmission processings by an easy operation with no need to operate the transmission start key.

An embodiment having the seventh inventive technical means is described below, referring to FIGS. 10 and 11(1) through 11(4).

Figure 10:
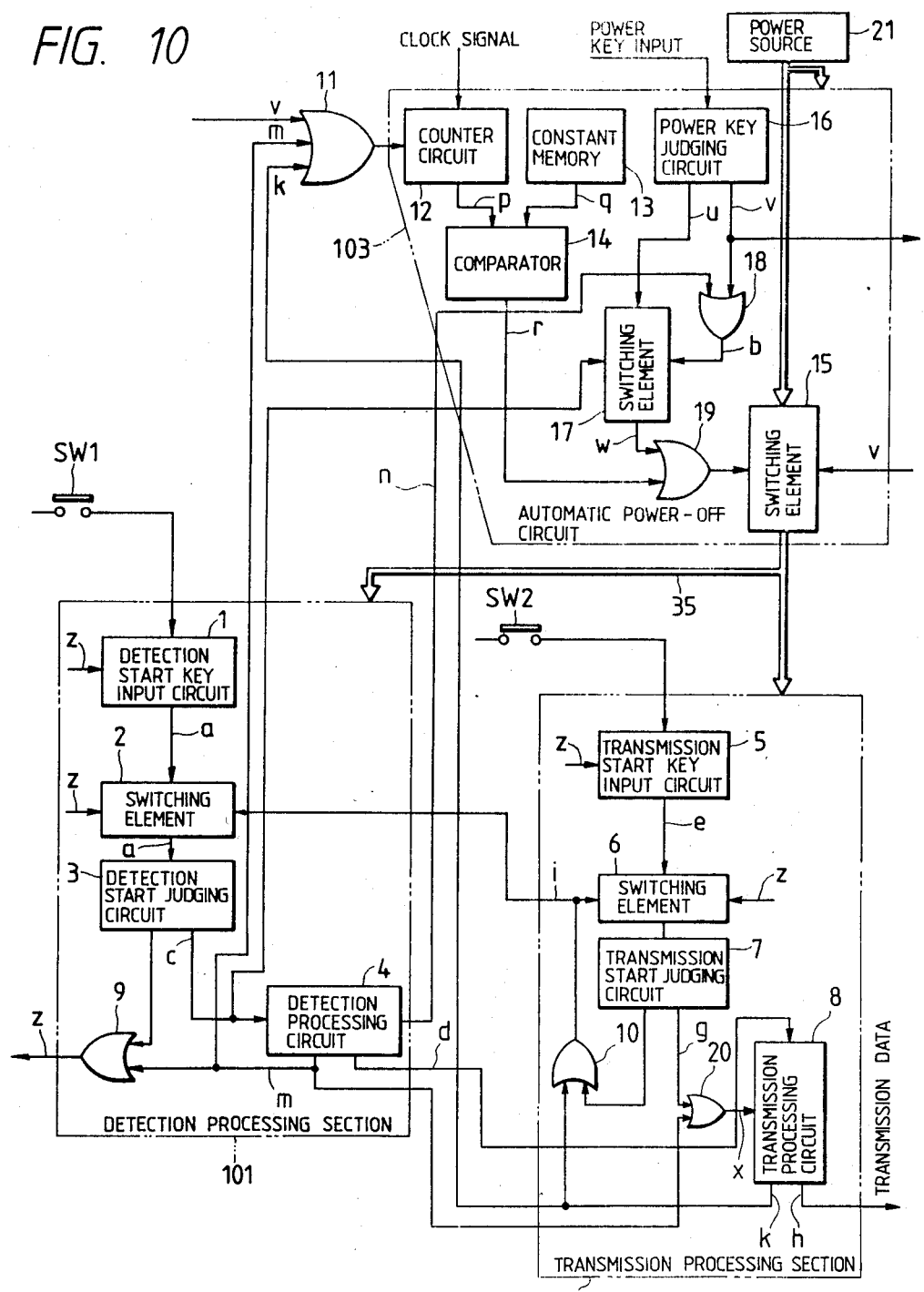
Figure 11:
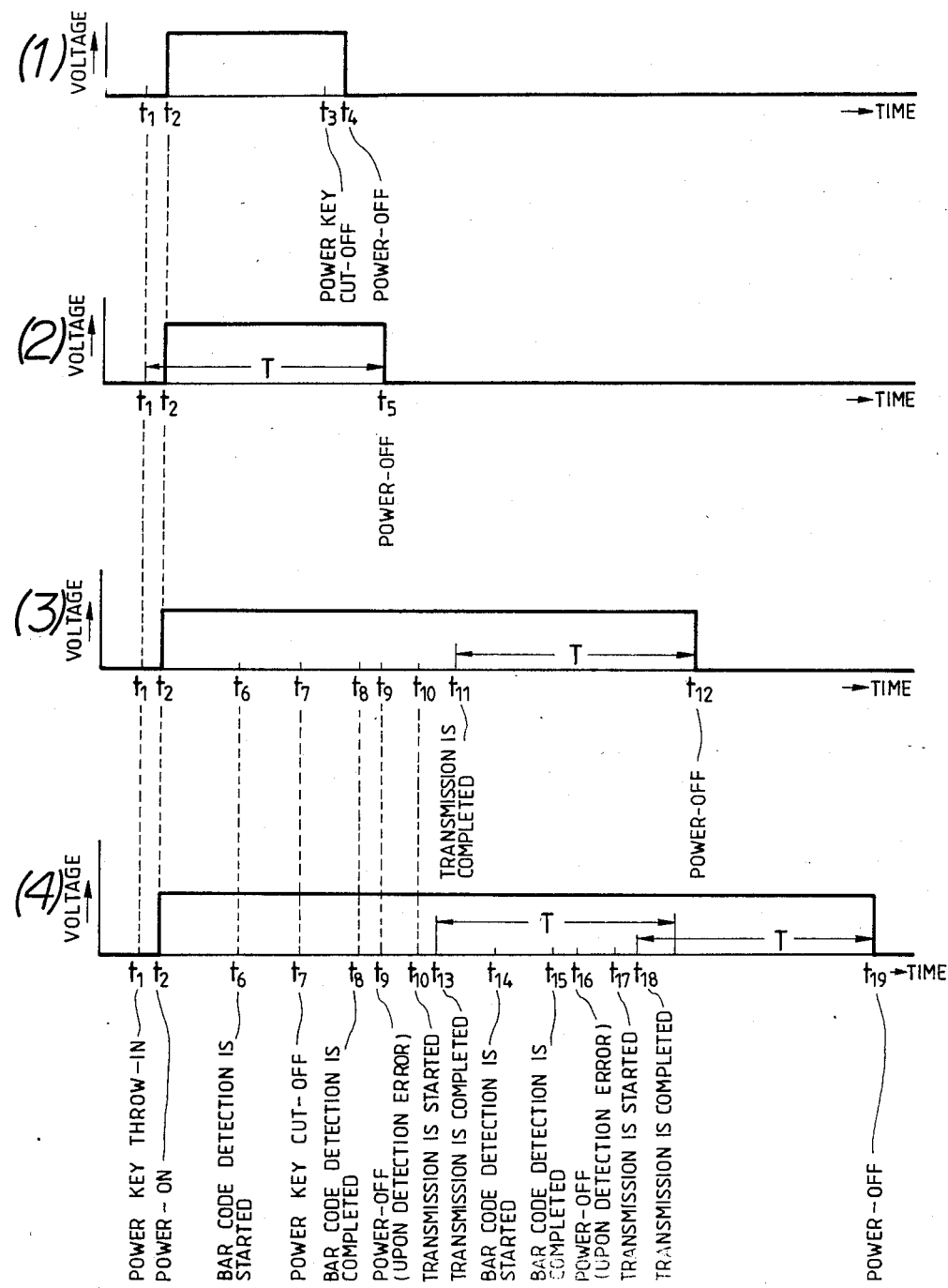

FIG. 10 is a circuit arrangement showing an embodiment, and FIGS. 11(1) through 11(4) are timing charts for explaining the operation of the device of FIG. 10.

In FIG. 10, reference numeral 101 refers to a detection processing section, 102 to a transmission processing section, 103 to an automatic power-off circuit, 21 to a power source, 16 to a power key judging circuit, 4 to a detection processing circuit, 8 to a transmission processing circuit, 17 to a switching element, and 20 to an OR circuit.

As shown in FIG. 10, the embodiment of the invention includes the OR circuit 18 and switching element in the automatic power-off circuit 103 and includes the OR circuit 20 in the transmission processing section 102 in addition to the prior art bar-code remote-control device of FIG. 20. The OR circuit 18 is supplied with a first reset signal v and a detection error signal n from the detection processing circuit 4, and an output terminal of the OR circuit 18 is connected to the switching element 17 so that the switching element 17 is turned on by an output signal b of the OR circuit 18.

The detection start judging circuit 3 is connected to the switching element 17 so that the switching element is turned off by a driving signal c from the detection start judging circuit 3. Further, the OR circuit 20 is supplied with a driving signal from the transmission start judging circuit 7 and a second reset signal from the detection processing circuit 4. The OR circuit 20 is connected to the transmission processing circuit 8 so that an output signal x from the OR circuit 20 responsive to the second reset signal m causes the transmission processing circuit 8 to start generation of a remote-control data signal h and automatic transmission of the produced remote-control data signal h to a host apparatus.

The remainder arrangement of the embodiment is identical to the prior art bar-code remote-control device of FIG. 20, and its explanation is omitted.

In the embodiment of FIG. 10, the power key judging circuit 16 forms a first detector means, the detection processing circuit 4 forms a second detector means, and the transmission processing circuit 8 forms a third detector means. Further, the switching element 17 forms a preventing means, and the OR circuit 20 forms a major part of an automatic transmission means.

The aforegoing embodiment operates as explained below.

When the detection start judging circuit 3 judges that the operation signal a is normal, the detection processing circuit 4 is activated by a driving signal c from the detection start judging circuit 3 to start bar code detection processing. The driving signal c is also entered in the switching element 17 and turns it off.

Therefore, also when an OFF signal u is outputted from the power source key judging circuit 16 upon a cut-off accident of the power source key during bar code detection processing in the detection processing circuit 4 in the detection processing section 101, the output signal w from the switching element 17 does not enter in the OR circuit 19 because the switching element 17 is held off. Therefore, the switching element 15 is not turned off, and power supply from the power source 21 to the detection processing section 101 and transmission processing section 102 is never interrupted.

In this fashion, in the event that the power key is cut off, the bar code detection of the detection processing circuit 4 is proceeded without being interrupted, and upon completion of the bar code detection, a second reset signal m from the detection processing circuit 4 is entered in the OR circuit 11, so that power supply from the power source 21 for a predetermined time from the input time is established.

At the same time, the second reset signal m from the detection processing circuit 4 is entered in the OR circuit 20 which responsively produces an output signal x which causes the transmission processing circuit 8 to start its transmitting operation.

Regarding bar code detection by the detection processing circuit, when the detection processing circuit 4 does not detect any detection input from the bar code for a predetermined time, it is judged that bar code detection is completed, and a second reset signal m is outputted responsively from the detection processing circuit 4. Therefore, a plurality of independent bar codes can be read continuously or successively by the detection processing circuit 4. In this case, the second reset signal m is outputted after detection of all bar codes is completed, and the transmission processing circuit 8 automatically starts its operation just when the second reset signal m is outputted.

When the detection processing circuit 4 makes an error during bar code detection, a detection error signal n is entered in the OR circuit 18 from the detection processing circuit 4, and the switching element 17 is turned on by an output signal b of the OR circuit 18. Therefore, when the power key is in a cut-off condition, an output signal w of the switching element 17 is applied to the switching element 15 via the OR circuit 19, and the switching element 15 is turned off to interrupt power supply from the power source 21 immediately.

FIGS. 11(1) through 11(4) are timing charts for explaining the above-described operations. As shown in FIG. 11(1), the prior art bar-code remote-control device starts power supply from the power source at time $t_2$, a short time later than the power source throw-in at time $t_1$; however, when the power key is cut off at time $t_3$ during bar code detection processing, power supply from the power source is interrupted a short time later at time $t_4$. In this case, when the power key is not cut off during bar code detection processing, the automatic power-off circuit is activated at time t as shown in FIG. 11(2), and power supply from the power source is interrupted time T later than the power key throw-in.

In contrast, in bar code detection and transmission by the inventive bar-code remote-control device shown in FIG. 11(3), even if the power key is cut off at time $t_7$ after bar code detection is started at time $t_6$, power supply from the power source is not interrupted. When the bar code detection is completed at time $t_8$ and a detection error is acknowledged, power supply from the power source is interrupted a short time later at time $t_9$ without delay.

However, as far as a detection error does not occur, the transmission processing circuit 8 is activated by the second reset signal m to produce a remote-control data signal and start transmission of the remote-control data signal to the host apparatus at time $t_{10}$. The transmission is completed at time $t_{11}$, and the transmission processing circuit 8 responsively produces a third reset signal k at time $t_{11}$ to interrupt power supply from the power source at time $t_{12}$.

Further, when reading multiple independent bar codes continuously or successively by the inventive bar-code remote-control device, as shown in FIG. 11(4), bar code detection which is started at time $t_6$ is continued without being interrupted also when the power key is cut off at time $t_7$, and the bar code detection is completed at time $t_8$. In this case, if a detection error is acknowledged, power supply from the power source is interrupted a short time later at time $t_9$ without delay.

Unless such a detection error is acknowledged, the transmission processing circuit 8 is activated by the second reset signal m to produce a remote-control data signal, start transmission of the remote-control data signal to the host apparatus at time $t_{10}$ and complete the transmission at time $t_{13}$. Subsequently, the third reset signal k is entered in the OR circuit 11 from the transmission processing circuit 8, and power supply from the power source 21 for a predetermined time T from this moment is established.

Within the predetermined time T, subsequent bar code detection is started at time $t_{14}$. When the detection is completed at time $t_{15}$, unless a detection error occurs, the transmission processing circuit 8 produces a remote-control data signal, transmits it to the host apparatus at time $t_{17}$, and completes the transmission a short time later at time $t_{18}$. When completing transmission of the remote-control data signal, the transmission processing circuit 8 applies the third reset signal k to the OR circuit 11, and power supply from the power source 21 for a predetermined time T from this moment is established.

When bar code detection is not effected thereafter, power supply from the power source 21 is interrupted at time $t_{19}$, i.e., the predetermined time T later than time $t_{18}$. If a detection error occurs in detection of the detection processing circuit 4, power supply from the power source 21 is interrupted at time $t_{16}$.

In this fashion, according to the embodiment, even if the power key is cut off during bar code detection, power supply from the power source 21 is not interrupted so as to continue to bar code detection, and upon completion of the detection, the detection processing circuit 4 produces the second reset signal m to activate the transmission processing circuit 8. Therefore, also when the power key is cut off during bar code detection, the detecting motion is proceeded without being interrupted, and upon completion of the detection, the transmission processing circuit 8 automatically produces a remote-control data signal and transmits it to the host apparatus in a smooth manner.

When a detection error occurs in the detection processing circuit 4, power supply from the power source 21 is interrupted at this moment so as to prevent useless power consumption.

Further, when multiple independent bar codes are read by the detection processing circuit 4 and transmitted every time by the transmission processing circuit 8 to the host apparatus, it is not necessary to operate the transmission start key every time. Therefore, an operator can operate the device efficiently.

The above-described devices having the respective inventive technical means give the following effects.

The first inventive technical means prevents erroneous operation caused by operations against the keys, simplifies and speeds up the operation, and contributes to a scale reduction of the entire body of the bar-code remote-control device.

The second inventive technical means makes it possible to provide a bar-code remote-control device which is readily operated and ensures reliable, smooth and efficient bar code detection processing and transmission to the host apparatus of the remote-control data signal based on the data signal obtained by the detection.

The third inventive technical means provides a bar-code remote-control device operative stably and reliably, and saving the power consumption so that the saved power is used to increase the transmission distance from the device to a host apparatus or to increase the life of the battery.

According to the fourth inventive technical means, bar code detection is continued and not interrupted also when the power key is cut off during bar code detection. Upon completion of the bar code detection, back-up power is supplied to the transmission processing circuit, in order to perform smoothly and not interrupt transmission of a remote-control data to a host apparatus.

According to the fifth inventive technical means, since power supply from the power source is not shut off and permits completion of bar code detection also when the power key is cut off during bar code detection, non-interrupted, efficient processing is ensured.

According to the sixth inventive technical means, generation of a remote-control data signal and transmission thereof to a host apparatus are performed automatically upon completion of bar code detection. That is, detection and transmission processings are performed efficiently by an easy operation.

According to the seventh inventive technical means, bar code detection is continued because the operation is not interrupted also when the power key is cut off during bar code detection. Upon completion of the bar code detection, generation of a remote-control data and transmission thereof to a host apparatus are effected automatically. Therefore, reliable, smooth detection and transmission processings are performed efficiently by an easy operation.

What is claimed is:

1. In a bar-code remote-control device including a controller section having at least a first key for inputting a detection instructing signal and a second key for inputting a transmission instructing signal; a bar-code detection processing section connected to said controller section and activated by the detection instructing signal outputted from said controller section to decode a bar code and obtain a data signal; and a remote-control data transmission processing section connected to said controller section and activated by the transmission instructing signal outputted from said controller section to take therein said data signal from said bar-code detection processing section, produce a remote-control data signal by encoding said data signal and transmit the remote-control data signal to a host apparatus, an improvement wherein said controller section includes a gate circuit which is opened after completion of a processing in said remote-control data transmission processing section to permit entrance of said detection instructing signal in said detection processing section.

2. In a bar-code remote-control device including a detection processing section for reading a bar code and obtaining a data signal; a transmission processing section for taking therein the data signal obtained in said detection processing section to produce a remote-control data signal by encoding said data signal and transmit it to a host apparatus; a power source for supplying power to said detection processing section and said transmission processing section; a first detector means for detecting application of said power source and generating a first reset signal; and an automatic poweroff circuit activated a predetermined time later than entrance of said first reset signal to shut off said power source in application condition; an improvement further comprising a second detector means for detecting completion of a processing in said detection processing section and generating a second reset signal; and a third detector means for detecting completion of a processing in said transmission processing section and generating a third reset signal, and wherein said automatic power-off circuit is arranged to shut off said power source a predetermined time later than entrance of the last entered reset signal when at least one of said second reset signal and said third reset signal is entered in said automatic power-off circuit during application period of said power source.

3. In a bar-code remote-control device including a detection processing section for reading a bar code; a transmission processing section for taking therein a data signal obtained in said detection processing section to produce a remote-control data signal by encoding said data signal and transmit it to a host apparatus; a power source for supplying power to said detection processing section and said transmission processing section; a first detector means for detecting supply of said power and generating a first reset signal; a second detector means for detecting completion of a processing in said detection processing section and generating a second reset signal; a third detector means for detecting completion of a processing in said transmission processing section and generating a third reset signal, and an automatic power-off circuit activated a predetermined time later than entrance of the last entered reset signal among said first reset signal, said second signal and said third reset signal to shut off said power source in application condition, an improvement further comprising a power source control means configured to cause said detection processing section to start its detection processing a predetermined time later than entrance of said first reset signal and shut off power supply to said detection processing section when a processing in said transmission processing section is started.

4. In a bar-code remote-control device including a detection processing section for reading a bar code; a transmission processing section for taking therein a data signal obtained in said detection processing section to produce a remote-control data signal by encoding said data signal and transmit it to a host apparatus; a power source responsive to an operation against a power key to supply power to said detection processing section and said transmission processing section; a first detector means for detecting supply of said power and generating a first reset signal; a second detector means for detecting completion of a processing in said detection processing section and generating a second reset signal; a third detector means for detecting completion of a processing in said transmission processing section and generating a third reset signal; and an automatic power-off circuit activated a predetermined time later than entrance of the last entered reset signal among said first reset signal, said second signal and said third reset signal to interrupt power supply from said power source, an improvement further comprising a preventing means activated when said power key is cut off during bar code detection to prevent interruption of said power supply until said bar code detection in said detection processing section is completed; and a back-up power supply means for supplying said transmission processing section with power from a back-up power source upon said interruption of power supply.

5. In a bar-code remote-control device including a detection processing section for reading a bar code; a transmission processing section for taking therein a data signal obtained in said detection processing section to produce a remote-control data signal by encoding said data signal and transmit it to a host apparatus; a power source responsive to an operation against a power key to supply power to said detection processing section and said transmission processing section; a first detector means for detecting supply of said power and generating a first reset signal; a second detector means for detecting completion of a processing in said detection processing section and generating a second reset signal; a third detector means for detecting completion of a processing in said transmission processing section and generating a third reset signal; and an automatic power-off circuit activated a predetermined time later than entrance of the last entered reset signal among said first reset signal, said second signal and said third reset signal to interrupt power supply from said power source, an improvement further comprising a preventing means activated when said power key is cut off during bar code detection by said detection processing section to prevent interruption of said power supply until said power supply is interrupted by said second reset signal.

6. In a bar-code remote-control device including a detection processing section for reading a bar code; a transmission processing section for taking therein a data signal obtained in said detection processing section to produce a remote-control data signal by encoding said data signal and transmit it to a host apparatus; a power source for supplying power to said detection processing section and said transmission processing section; a first detector means for detecting supply of said power and generating a first reset signal; a second detector means for detecting completion of a processing in said detection processing section and generating a second reset signal; a third detector means for detecting completion of a processing in said transmission processing section and generating a third reset signal; and an automatic power-off circuit activated a predetermined time later than entrance of the last entered reset signal among said first reset signal, said second signal and said third reset signal to interrupt power supply from said power source, an improvement further comprising a means for supplying said third detector means with a detection output of said second detector means so that when said data signal obtained in said detection processing section is normal, said transmission processing section effects automatic transmission of said remote-control data signal to said host apparatus.

7. In a bar-code remote-control device including a detection processing section for reading a bar code; a transmission processing section for taking therein a data signal obtained in said detection processing section to produce a remote-control data signal by encoding said data signal and transmit it to a host apparatus; a power source responsive to an operation against a power key to supply power to said detection processing section and said transmission processing section; a first detector means for detecting supply of said power and generating a first reset signal; a second detector means for detecting completion of a processing in said detection processing section and generating a second reset signal; a third detector means for detecting completion of a processing in said transmission processing section and generating a third reset signal; and an automatic power-off circuit activated a predetermined time later than entrance of the last entered reset signal among said first reset signal, said second signal and said third reset signal to interrupt power supply from said power source, an improvement further comprising a preventing means activated when said power key is cut off during bar code detection by said detection processing section to prevent interruption of said power supply; and an automatic transmission means responsive to said second reset signal to make said transmission processing means perform its transmission processing.

* * * * *